(12) United States Patent
Pratt

(10) Patent No.: US 12,623,523 B2
(45) Date of Patent: May 12, 2026

(54) AUTOMOBILE ACCESSORY OR ASSEMBLY COMPRISING PLURAL ACCESSORIES

(71) Applicant: Glen Pratt, Amarillo, TX (US)

(72) Inventor: Glen Pratt, Amarillo, TX (US)

( * ) Notice: Subject to any disclaimer, the term of this patent is extended or adjusted under 35 U.S.C. 154(b) by 603 days.

(21) Appl. No.: 17/951,472

(22) Filed: Sep. 23, 2022

(65) Prior Publication Data

US 2023/0087816 A1 Mar. 23, 2023

Related U.S. Application Data

(60) Provisional application No. 63/247,675, filed on Sep. 23, 2021.

(51) Int. Cl.
*B60R 9/04* (2006.01)
*B60J 7/10* (2006.01)
(Continued)

(52) U.S. Cl.
CPC ............. *B60J 7/1621* (2013.01); *B60J 7/106* (2013.01); *B60R 9/04* (2013.01); *E04H 15/06* (2013.01)

(58) Field of Classification Search
CPC ......... B62D 25/06; B60J 7/1621; B60J 7/106; B60R 9/04; B60R 9/045; B60P 3/34; B60P 3/36; B60P 3/38; B60P 3/39; E04H 15/06
(Continued)

(56) References Cited

U.S. PATENT DOCUMENTS

| | | | | |
|---|---|---|---|---|
| 3,924,365 A | * | 12/1975 | Orberg | B60P 3/38 |
| | | | | 52/63 |
| 5,577,649 A | * | 11/1996 | Lee, Jr. | B60P 7/135 |
| | | | | 224/325 |

(Continued)

OTHER PUBLICATIONS

American Safari JXL: Jeep Wrangler Extension & Camper System by Red River Rigs (Savage Camper), 1retrieved from https://savagecamper.com/american-safari-jxl-jeep-wrangler-extension-camper-system/ on Feb. 7, 2023.

(Continued)

*Primary Examiner* — Gregory A Blankenship
(74) *Attorney, Agent, or Firm* — Sarah Hegi Simpson; Simpson Law

(57) ABSTRACT

One disclosed embodiment of an assembly of automobile accessories comprises a ring rack, a roof, and a cargo holder. A particular disclosed embodiment comprises a metal ring rack comprising two side rails, an end, and plural mounting brackets that allow the rack to be mounted to the roof of an existing automobile. A two-tiered, molded fiberglass roof is coupled to the ring rack by hinged mounting brackets. The roof can be positioned in an open or closed position by actuating pneumatic struts. A cargo holder is disclosed that includes two side gates that are coupled to structural rails by hinges that allow a user to access cargo stored in the cargo storage section. A fairing may be coupled to the cargo holder that is oriented at substantially a same angle as an angled end portion of the first section of the roof to facilitate wind deflection. The present disclosure also concerns automobiles to which an after-market ring rack, a roof, a cargo holder, an extension tub, and/or a vehicle body extension framework are attached. For example, an automobile may comprise a rear and rear side vehicle protection system comprising a custom-made bumper, the bumper comprising a step, a coupler for attaching tow ropes or chains, one or more built (Continued)

in storage sections, with each such storage section comprising an access door and door latch, accommodation for vehicle lights, and combinations of such features.

20 Claims, 28 Drawing Sheets

(51) Int. Cl.
  *B60J 7/16*          (2006.01)
  *E04H 15/06*         (2006.01)
(58) Field of Classification Search
  USPC ....... 224/309, 310, 315, 316, 317, 324, 325, 224/326, 328; 296/37.7
  See application file for complete search history.

(56)                References Cited

U.S. PATENT DOCUMENTS

| | | | | |
|---|---|---|---|---|
| 6,561,397 | B1 * | 5/2003 | Bauer | B60R 9/045 224/325 |
| 7,845,528 | B2 * | 12/2010 | McMillan | B60R 9/055 224/310 |
| 10,077,574 | B1 * | 9/2018 | Currid | B60P 3/343 |
| 10,596,951 | B1 * | 3/2020 | Williams | B60J 7/1657 |
| 10,890,010 | B1 | 1/2021 | Chang et al. | |
| 11,130,437 | B1 * | 9/2021 | Tatro | B60P 3/39 |
| 11,840,857 | B1 * | 12/2023 | Gauthier | B60P 3/341 |
| 2004/0134949 | A1 * | 7/2004 | Aftanas | B60R 9/045 224/321 |
| 2006/0163296 | A1 * | 7/2006 | McMillan | B60R 9/05 224/319 |
| 2007/0001486 | A1 | 1/2007 | Dowdey et al. | |
| 2008/0149675 | A1 * | 6/2008 | Moreau | B60R 9/045 224/320 |
| 2008/0169322 | A1 | 7/2008 | McMillan | |
| 2019/0047387 | A1 * | 2/2019 | Sviberg | B60J 7/02 |
| 2019/0202333 | A1 * | 7/2019 | Delgadillo, Jr. | B60J 7/1657 |
| 2019/0352924 | A1 | 11/2019 | Currid | |
| 2021/0025190 | A1 | 1/2021 | Montesalvo et al. | |
| 2022/0243495 | A1 * | 8/2022 | Davis, Jr. | E04H 15/008 |
| 2023/0085952 | A1 * | 3/2023 | Huang | B60R 9/045 224/326 |
| 2023/0087816 | A1 * | 3/2023 | Pratt | B60R 9/06 296/100.1 |
| 2023/0146506 | A1 * | 5/2023 | Gozzi | B32B 5/02 296/210 |
| 2024/0101039 | A1 * | 3/2024 | Warech | B60R 9/045 |
| 2025/0003250 | A1 * | 1/2025 | Sharples | B60P 3/341 |

OTHER PUBLICATIONS

International Search Report from International Application No. PCT/US2022/044523 dated Feb. 1, 2023 (5 pages).
Written Opinion from International Application No. PCT/US2022/044523 dated Feb. 1, 2023 (8 pages).

* cited by examiner

AUTOMOBILE ACCESSORY OR ASSEMBLY COMPRISING PLURAL ACCESSORIES

CROSS REFERENCE TO RELATED APPLICATION

This application claims the benefit of the earlier filing date of U.S. provisional patent application No. 63/247,675, filed on Sep. 23, 2021, which is incorporated herein by reference in its entirety.

FIELD

The present application concerns an automobile accessory, or combinations of accessories, for addition to, or for modifying, after-market vehicles, or for installing after-market modifications on vehicles, such as four-wheel-drive vehicles generally including, for example, jeeps and broncos.

BACKGROUND

Vehicle owners must buy multiple aftermarket items, including assemblies and mounting brackets, in order to mount cargo and accessories to their roof top. This is particularly true for off-road capable vehicles, such as those intended for camping or longer-range expeditions.

The need to modify as-purchased vehicles is both expensive and time-consuming for the vehicle owner. These after-market additions also typically decrease the aerodynamics and mileage performance of the vehicle. These problems are compounded if vehicle owners want to use their vehicle as a platform for camping since the vehicle is required to accommodate more uses and equipment.

Accordingly, there is a need for after-market automobile accessories that address these deficiencies in currently known products.

SUMMARY

Certain disclosed embodiments concern an automobile accessory, or an assembly of such accessories, that address deficiencies in currently known products. One disclosed embodiment of an assembly of automobile accessories comprises a ring rack, a roof, and a cargo holder. An exemplary embodiment of the disclosed invention concerns a U-shaped mounting rack accessory system (ring rack), a raisable or fixed roof or multiple tiered roof with or without tent (roof), and a vehicle top cargo system (cargo holder).

The ring rack typically is constructed from metal, such as steel and/or aluminum, and may comprise two side rails, an end, and plural mounting brackets for mounting the rack to the roof of an existing automobile. The ring rack may comprise plural cut outs to reduce the weight of the metal rack. The roof may be a single-tier roof, but in certain embodiments preferably is a two-tiered roof comprising a first forward section and a second rearward section, wherein the second section has an increased height relative to the first section. Disclosed roof embodiments may comprise a molded fiberglass construction, and optionally one or both of the first section and the second section may include plural ribs to increase the strength of the roof. The first section of the roof, the second section of the roof, or both, may include angled end portions to facilitate wind deflection and increased structural strength.

The first section of the roof defines a surface that, in association with the cargo holder, defines a cargo holding section. An exemplary cargo holder comprises a front rail, an end rail, and two side gates. The cargo holder also includes a fairing oriented at substantially a same angle as an angled end portion of the first section of the roof to facilitate wind deflection. The two side gates are coupled to the front rails by hinges to allow a user access to cargo stored in the cargo storage section. The side gates may further comprise a spring-actuated latch and a catch and an actuation handle to facilitate moving the sides gates to either an open or closed position.

The front section of the roof is coupled to the ring rack by hinged mounting brackets. Pneumatic struts lift and position the roof in an open position as the roof rotates into position by pivoting about the hinged mounting brackets. The roof optionally may include one or more windows and/or faux windows. In certain disclosed embodiments, the roof includes a forward faux window and a rear faux window.

Custom-made bumper accessories also are disclosed that include one or more features useful or desired by a user. For example, the bumper may comprise one or more of a step, a coupler for attaching tow ropes or chains, one or more built in storage sections comprising an access door and a door latch, a one or more after-market lighting accommodations, and any and all combinations thereof.

The automobile accessory may further comprise a component or components that extend an automobile body length. These embodiments may, for example, include extenders and an extension tub that is connected to the automobile by the extenders. The extenders and extension tub allow the length of an automobile to be extended to accommodate such as to, for example, lengthen the automobile to increase internal and external cargo area, accommodate cargo and accessory mounting systems, accommodate camping bed bunk and tent, and accommodate a modified roof.

A particular disclosed embodiment comprises a ring rack made from steel, aluminum or a combination thereof. The ring rack comprises two side rails, an end, and plural mounting brackets that allow the rack to be mounted to the roof top of an existing automobile. The ring rack also includes plural cut outs to reduce the weight of the rack. In one embodiment, a two-tiered, molded fiberglass roof is coupled to the ring rack by hinged mounting brackets coupled to a front section of the roof, where the roof comprises a first forward section and a second rearward section, the second section having an increased height relative to the first section. One or both of the first section and the second section may include plural ribs to increase the roof strength. The first section of the roof, the second section of the roof, or both, includes angled end portions to facilitate wind deflection and to increase roof structure strength. The roof can be positioned in an open or closed position by actuating pneumatic struts or the roof may be non-raisable and fixed in position. This embodiment also may include a cargo holder comprising a front rail that includes a fairing coupled thereto, the fairing being oriented at substantially a same angle as an angled end portion of the first section of the roof to facilitate wind deflection, an end rail, and two side gates that are coupled to the front rails by hinges to allow a user access to cargo stored in the cargo storage section. The side gates can be opened or closed using an actuation handle to actuate a spring-actuated latch that moves the latch into or out of contact with a latch catch.

The present disclosure also concerns automobiles to which an after-market ring rack, a roof, a cargo holder, an extension tub, and/or rear-vehicle protection system are attached.

The foregoing and other objects, features, and advantages of the invention will become more apparent from the following detailed description, which proceeds with reference to the accompanying figures.

DETAILED DESCRIPTION

I. Definitions

Figure 1:
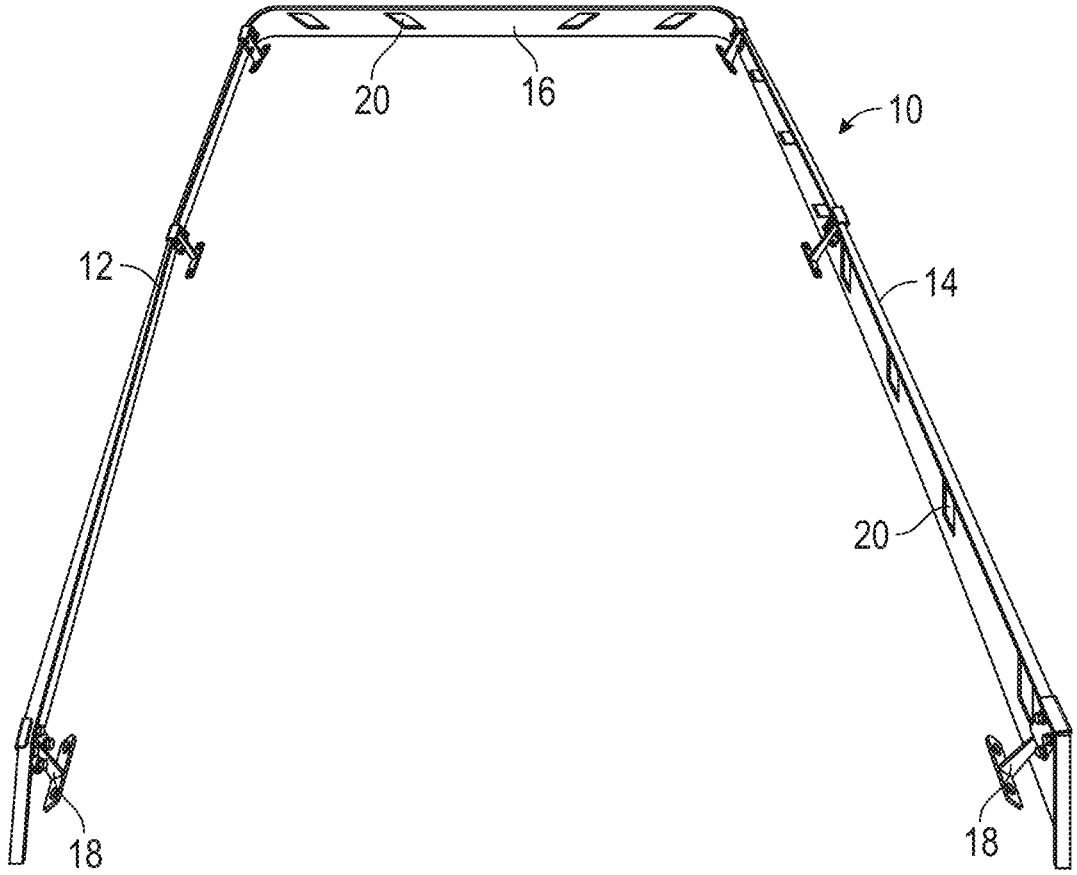
FIG. 1 is an elevated view from a first, automobile forward end of one embodiment of an after-market automobile accessory according to the present invention.
Figure 2:
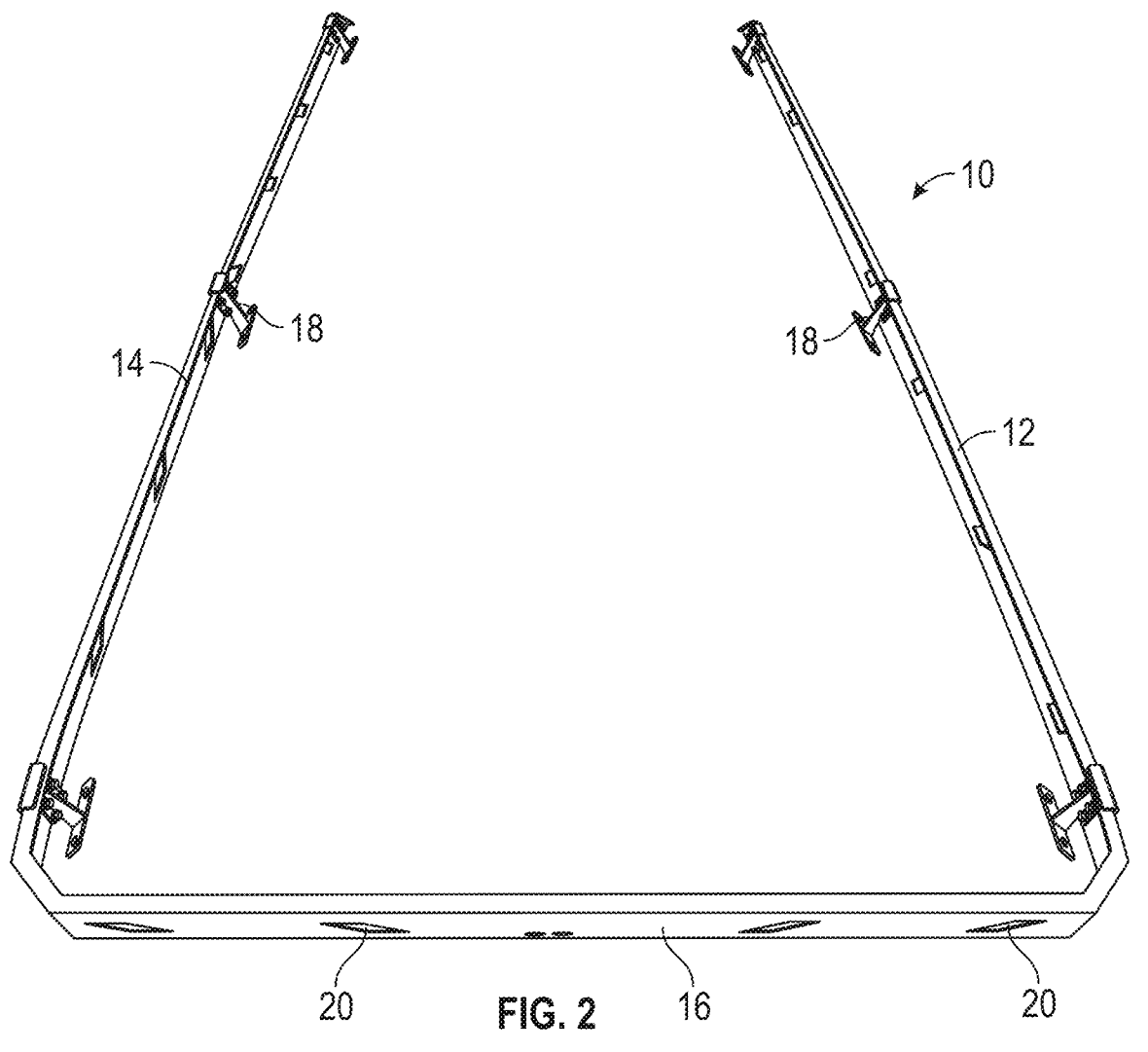
FIG. 2 is elevated view from a second, automobile rearward end of one embodiment of an after-market automobile accessory according to the present invention.

Unless explained otherwise, all terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and are not intended to be limiting.

The disclosure of numerical ranges should be understood as referring to each discrete point within the range, inclusive of endpoints, unless otherwise noted. Unless otherwise indicated, all numbers used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought as will be understood by a person of ordinary skill in the art. When directly and explicitly distinguishing embodiments from discussed prior art, the embodiment numbers are not approximates unless the word "about" is recited.

II. Introduction

A. Two Tier Automobile Accessory and Cargo Holder

A solution is needed in which the automobile roof itself includes the accommodations needed for equipment and cargo. The roof itself also may include a camping tent, and may accommodate both externally-mounted items as well as internally-secured cargo and items. The roof itself may be single tiered, two-tiered, or have more than two tiers, and may be fixed and or movable, raiseable, and removable. Disclosed embodiments:

may be useful for conventional and extended length vehicle conversions;

may be used in combination with non-removable fixed "solid" top roofs, or with roofs that are removable and replaceable;

may be used in combination with movable and removable camper top with attached camping tent;

may include motion-enabled roof functions with hinges, electronic linear actuators, springs, and/or other features;

may include built-in accommodations for typical after-market accessories including, but not limited to lights, cargo placement, tools, supplies;

may include internal storage areas;

increase vehicle cargo capacity and balance by spreading weight of mounted items around entire perimeter of the vehicle's top versus concentrating weight only on specific bracket locations;

may include unique built-in hinged cargo rails to facilitate access to cargo during loading and unloading;

may include faux windows and/or built-in windows to increase internal lighting and visibility;

a roof shape that increases aerodynamic capabilities of vehicles with windward-facing angles, graduated increase in height, two-tiered height-increase design, hidden hinges and attachments;

may allow cargo mounting in the forward top area of the roof;

roof may include an increase in height along its length to accommodate either built-in storage receptacles underneath in the "ceiling" area in a stationary roof or thicker-than-industry-standard sleeping mattress and bedding underneath in the camper option bunk area;

the rear section of the roof may accommodate additional cargo and accessories such as solar panels;

current/preferred/first commercial embodiments have been designed primarily for use with Jeep models, such as the American Safari JXL Extended Length Jeep and Camper Conversion;

may be made using construction materials that include, but are not limited to, fiberboard core, fiberglass-strengthened polyester, carbon fiber, steel, aluminum, fiberglass-compatible paint, vinyl-type material headliner, an insulation layer, and associated attachment mechanisms; and approximate dimensions for certain disclosed embodiments have been 50 inches (1.2 meters) wide×102 inches (2.5 meters) long comprising a first tier that is 5 inches (0.13 meters) tall and 42 inches (1.1 meters) deep and a second tier that is 9 inches (0.23 meters) tall and 60 inches (1.52 meters) deep.

B. Modified Rear Automobile Protection and Attachment System Lengthened Vehicles and for Stock Bumpers on Lengthened Vehicles Certain disclosed embodiments also concern a modified rear automobile protection and attachment system to attach stock or custom-built bumpers. Certain advantages of these embodiments include:

allows owners to utilize their existing stock rear bumper on an extended/lengthened vehicle conversion;

providing side armor protection for the rear and rear sides of the vehicle, with armor extending forward to the rear wheel well;

include specially-designed frame extensions that attach to the vehicle frame rather than to the vehicle body;

accommodate rear vehicle entry via a built-in ladder system; and accommodates tools and accessory mountings of items such as, but not limited to, a spare tire, swing out tire carrier, tools, liquid containers, such as water and fuel containers, lights, cameras, etc.

III. Disclosed Embodiments

FIGS. 1-4 provide views of an after-market automobile accessory 10 according to the present invention, referred to herein as a ring rack. Ring rack 10 includes two side rails 12, 14, and an end 16. Side rails 12, 14 and end 16 may be joined to form the unitary ring rack 10 using any suitable technique, including brackets and bolts, or welding. Alternatively, the ring rack 10 may be fabricated as a unitary structure.

Figure 4:
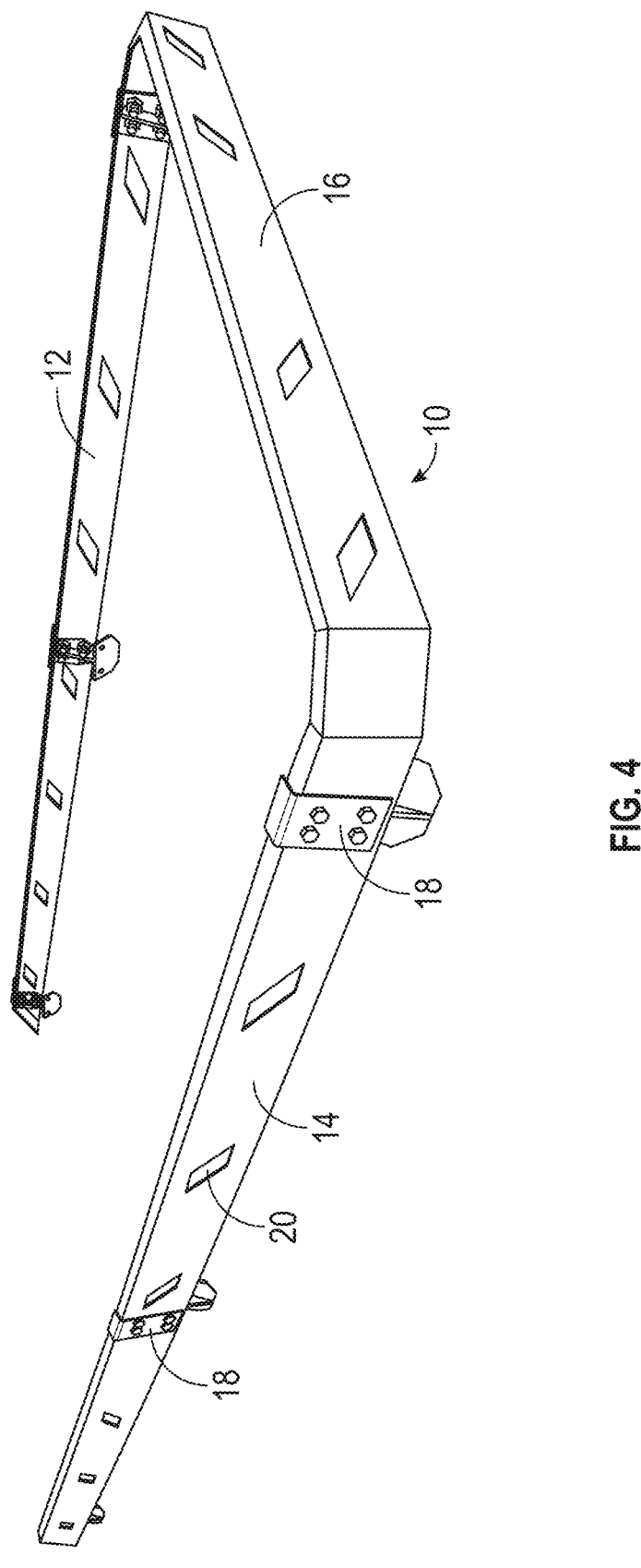
FIG. 4 is perspective view from a second automobile rearward end of one embodiment of an after-market automobile accessory according to the present invention.

Ring rack 10 includes plural mounting brackets 18 that allow the rack to be mounted as an after-market addition to the roof of an existing automobile. Ring rack 10 may be made from any suitable material, such as metals, with steel and aluminum being exemplary suitable materials. Metal ring racks may pose a weight issue, as many automobile roofs have a weight limitation. Accordingly, ring rack 10 also may include a number of cut out sections 20 to reduce the weight of the metal rack, provide air flow, and/or may be included solely as an aesthetic feature. FIG. 4 provides a perspective view from a second, automobile rear end of ring rack 10 according to the present invention. FIG. 4 better illustrates the structure of mounting brackets 18, and further illustrates using the mounting brackets to couple rails 12 and 14 to end 16.

Figure 3:
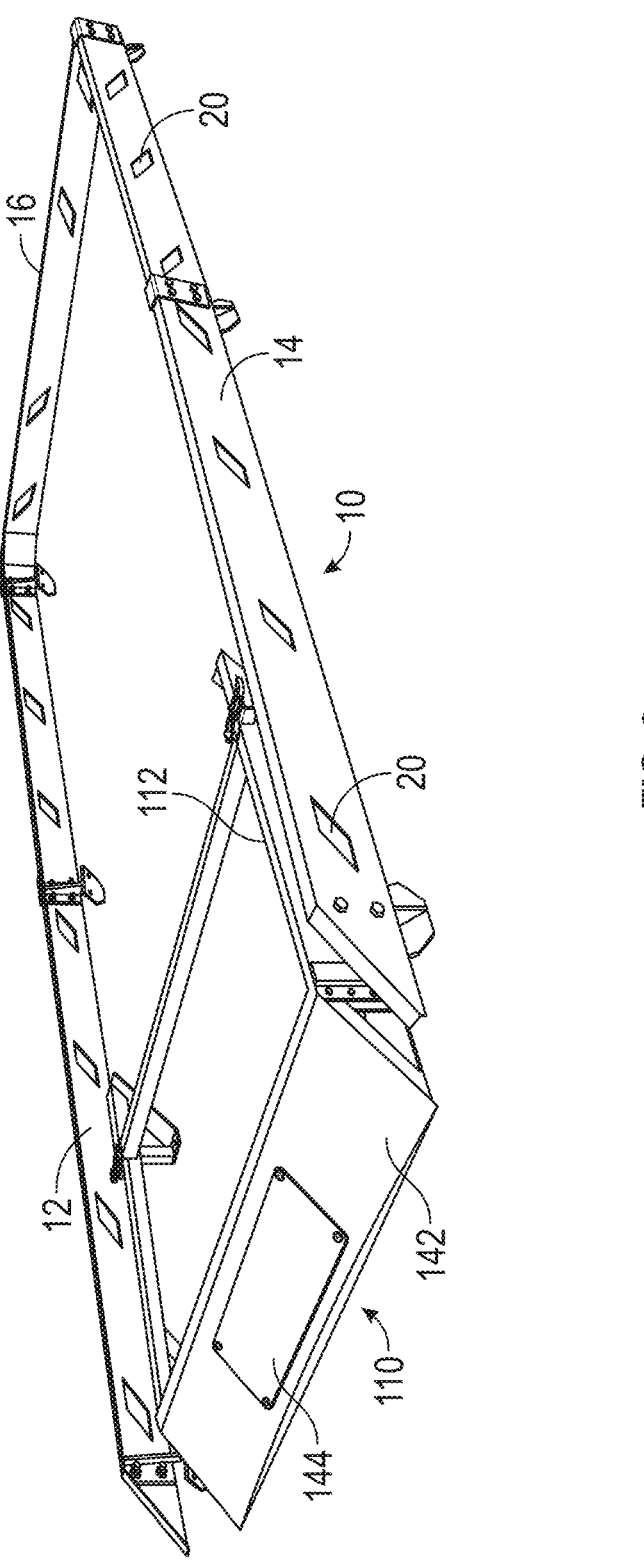
FIG. 3 is perspective view from a first automobile forward end of one embodiment of an after-market automobile accessory according to the present invention, together with a cargo holder comprising an end plate/wind fairing.
Figure 5:
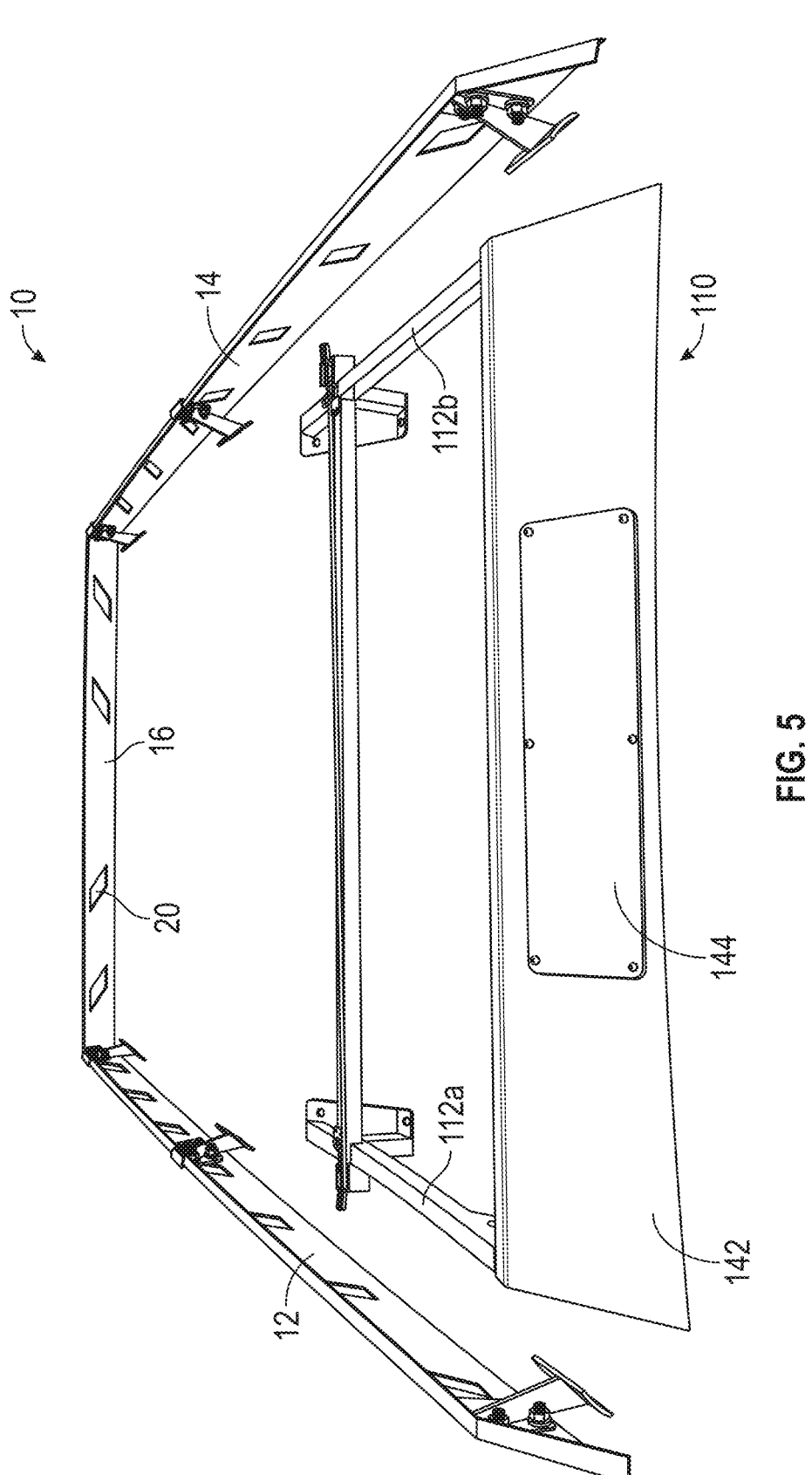
FIG. 5 is an elevated end view from a first, automobile forward end of one embodiment of an after-market automobile accessory according to the present invention, together with a cargo holder and associated end plate/wind fairing.
Figure 6:
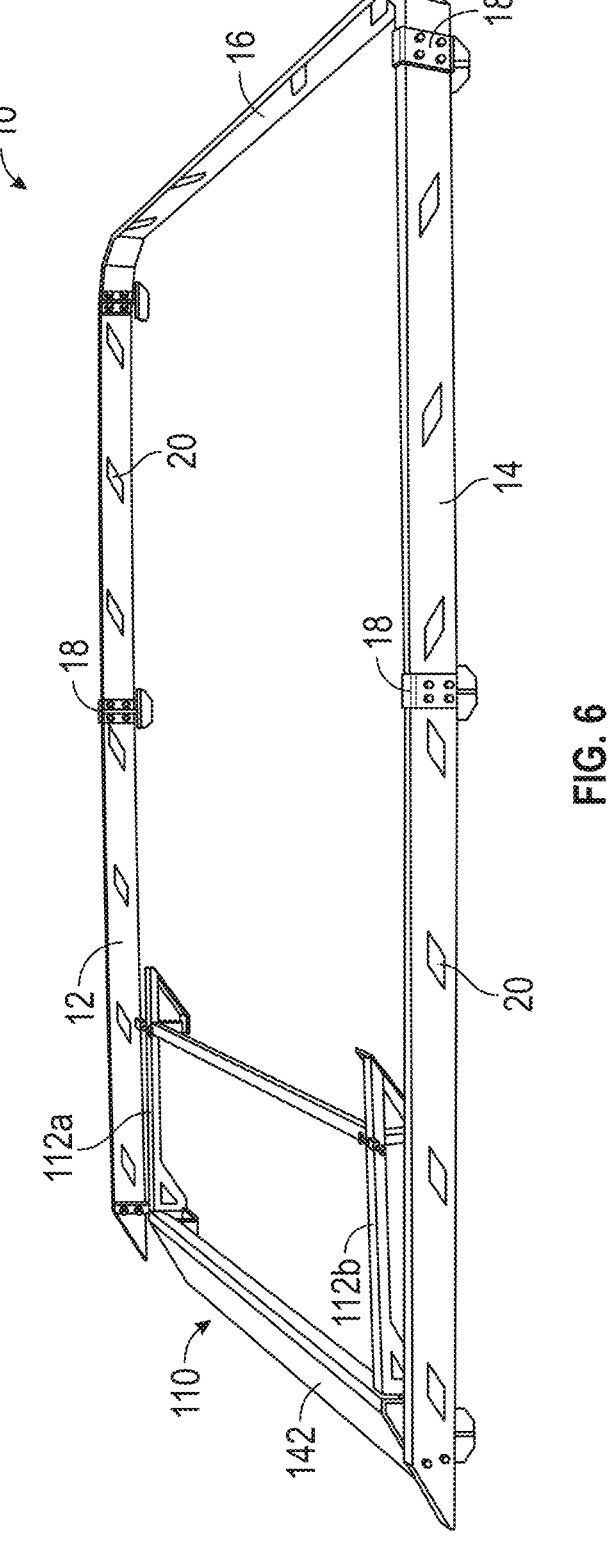
FIG. 6 is an elevated side view of one embodiment of an after-market automobile accessory according to the present invention, together with a cargo holder comprising an end plate/wind fairing.

FIGS. 3, 5 and 6 illustrate an embodiment of a ring rack 10 according to the present invention and a cargo holder 110 that is positioned adjacent to or in between the open-end sections of rails 12, 14. FIG. 3 is perspective view from a first automobile forward end of one embodiment of ring rack 10 according to the present invention, together with a cargo holder 110 that comprises gates 112, an end plate/wind fairing 142 and an information plate 144 that can be used to include trademarks or other marketing indicia.

FIG. 5 is an elevated end view from a first, automobile forward end of one embodiment of a ring rack 10 according to the present invention, together with a cargo holder 110 that includes an associated end plate/wind fairing 142. FIG. 5 also illustrates including a marketing information plate 144 that can be used to include trademarks or other marketing indicia, such as a stylized star-R, indicating source or origin of the disclosed embodiments. Embodiments of the cargo holder 110 are described in more detail below. FIG. 6 is an elevated side view of ring rack 10 according to the present invention, together with a cargo holder 110 comprising end plate/wind fairing 142.

Figure 7:
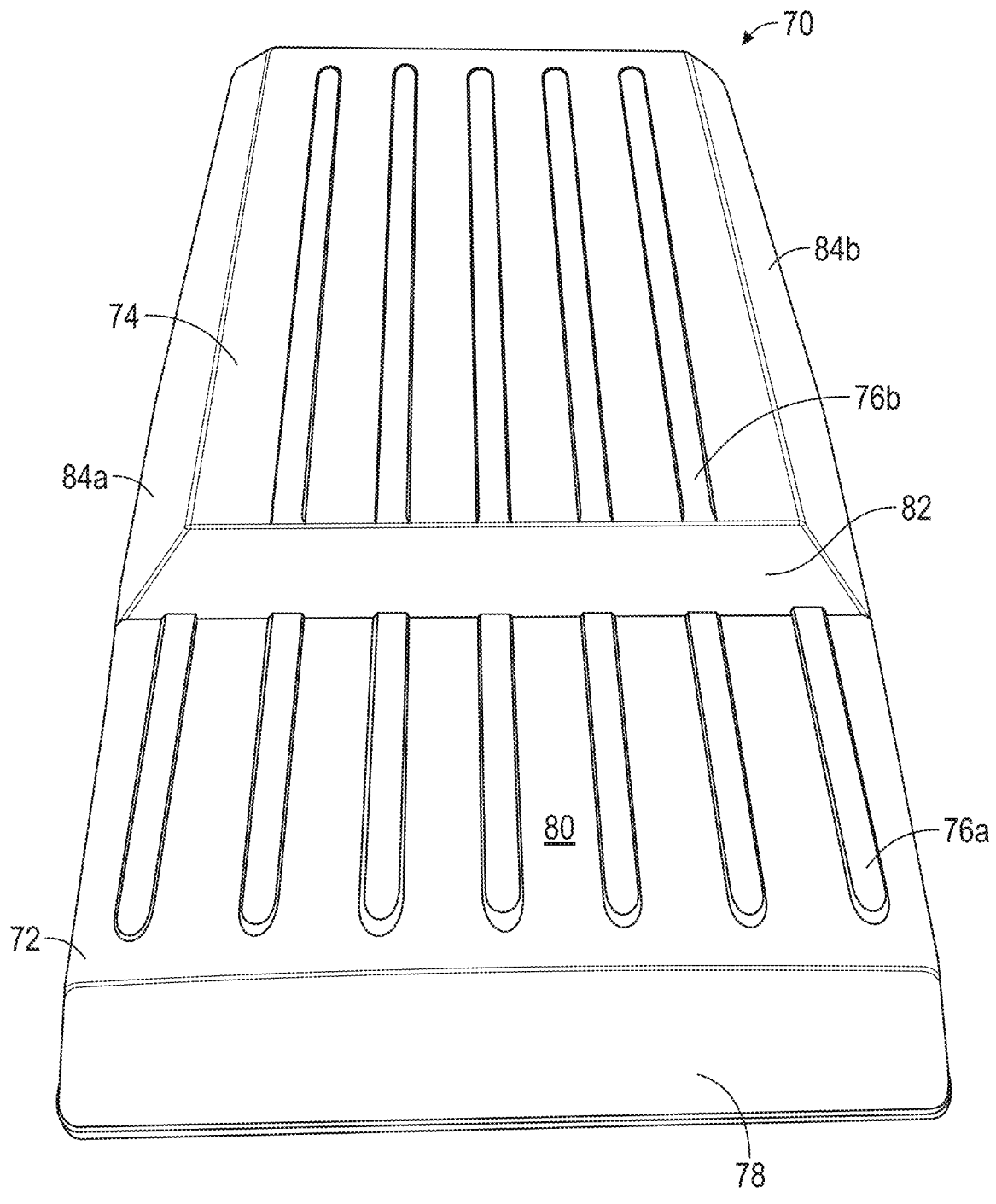
FIG. 7 is an elevated end view of one embodiment of a two-tier roof according to the present invention.
Figure 8:
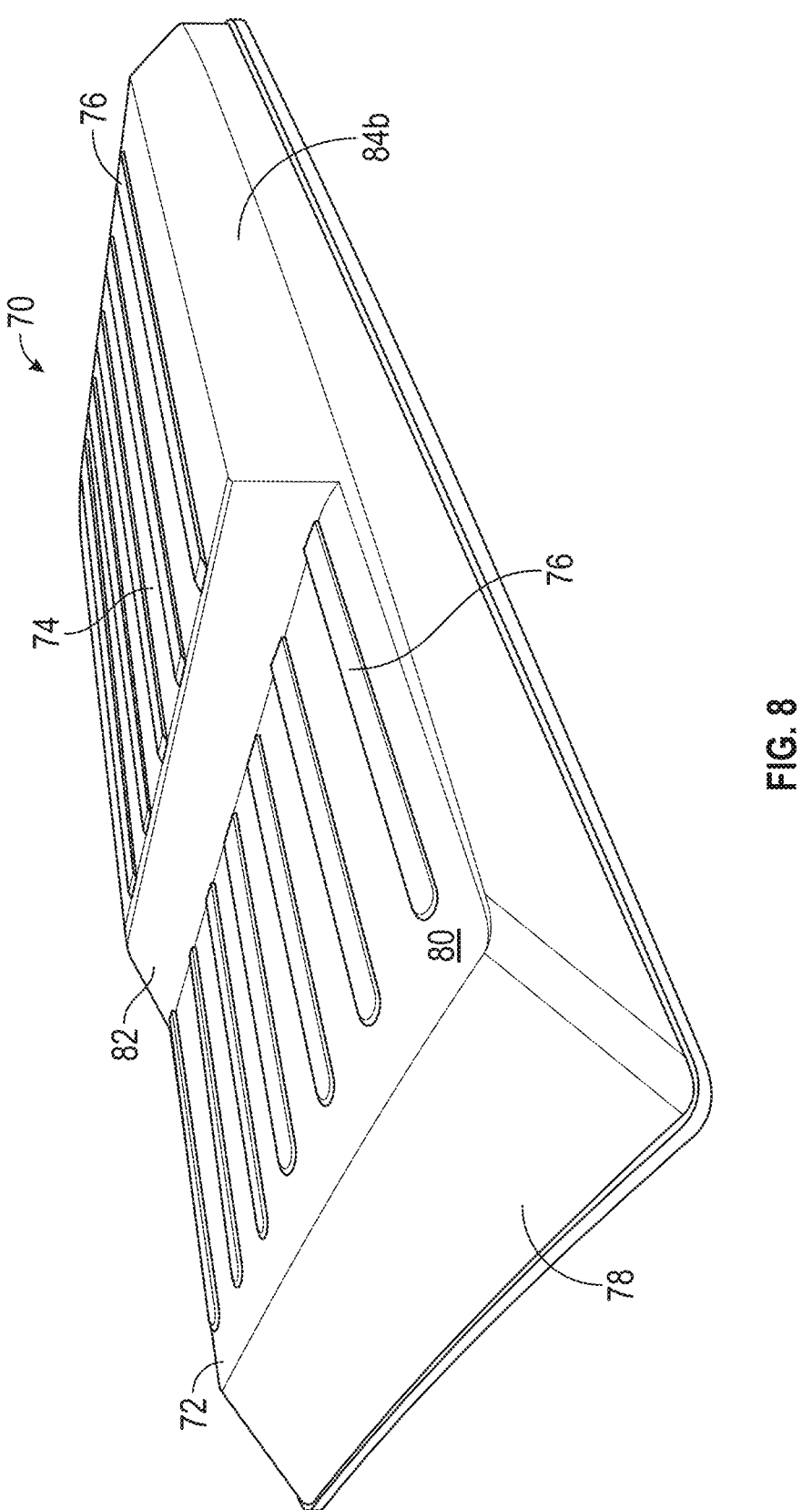
FIG. 8 is a perspective view of one embodiment of a two-tier roof according to the present invention.
Figure 9:
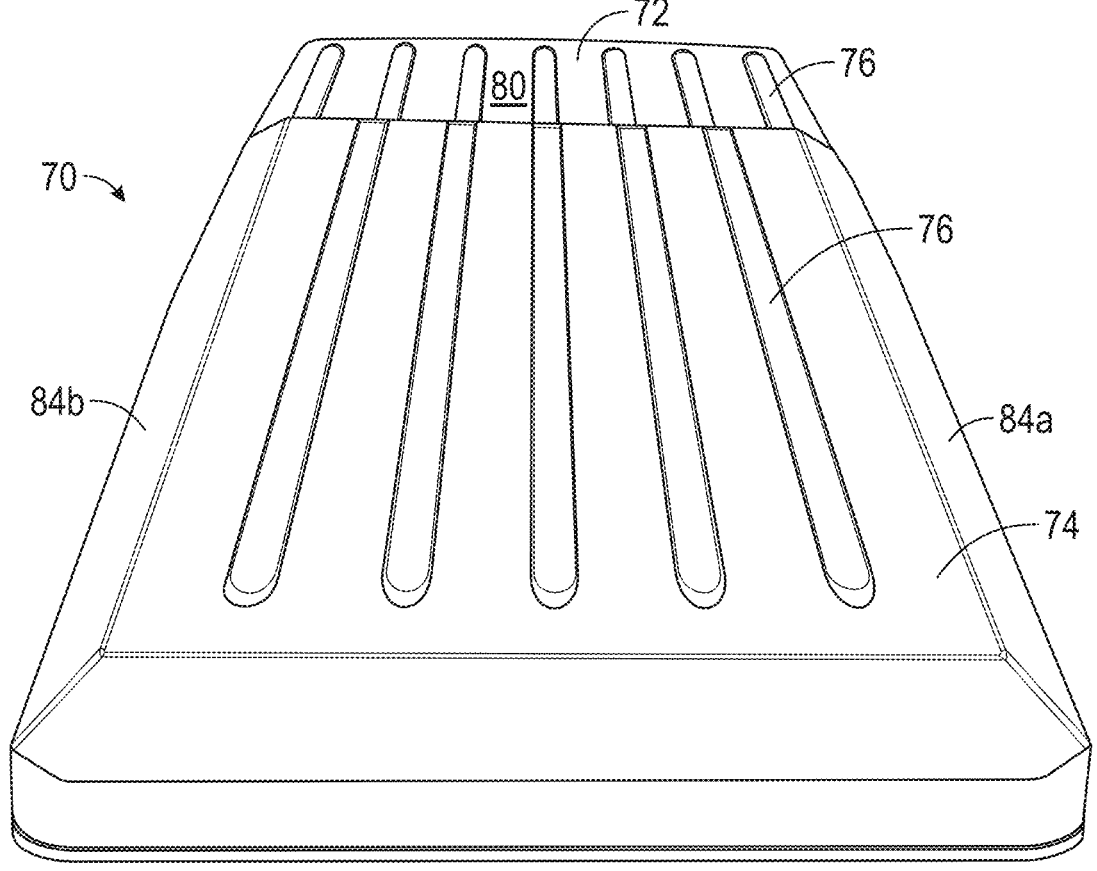
FIG. 9 is an elevated end view of a two-tier roof according to one embodiment of the present invention.

FIGS. 7-9 illustrate one embodiment of a two-tier roof 70 that can be installed on a commercially available automobile alone or as an assembly in association with ring rack 10. With reference to alignment with an automobile, roof 70 includes a first forward section 72 and a second rearward section 74. Both sections 72 and 74 include plural ribs 76a, 76b that may be included with certain exemplary embodiments for a number of reasons, such as to increase strength of a fiberglass molded roof 70, or simply for ornamental purposes, such as to match the aesthetic design of automobiles on which the roof 70 is mounted.

Section 72 includes an angled end section 78 to reduce drag and provide wind deflection. Section 72 also defines a surface 80 that, in association with the cargo holder 110, defines a cargo holding section as discussed in more detail below. Rear section 74 has an increased height relative to section 72, such as a height increase of from 4 to 10 inches (0.1 meter to 0.25 meter) to facilitate use of disclosed systems by a user, such as to accommodate internal features, including increased mattress thickness for associated pop-tents, again as discussed in more detail below. Rear section 74 also includes an end section 82 that may be fabricated to include an angle to facilitate wind deflection. For certain commercial embodiments, end sections 78 and 82 were about 6 inches (about 0.15 meter) high and were molded to include an angle. One embodiment of the two-tier roof 70 was approximately 50 inches (1.2 meters) wide×102 inches (2.5 meters) long comprising a first tier that was 5 inches (0.13 meters) tall and 42 inches (1.1 meters) deep and a second tier that was 9 inches (0.23 meters) tall and 60 inches (1.52 meters) deep. However, a person of ordinary skill in the art will understand that these dimensions are not critical, and instead are substantially determined by the dimensions of the receiving automobile, aesthetics, and desired increase in internal space beneath the roof 70. Two-tier roof 70 comprises sides 84a, 84b, and such sides also may be formed at an angle, to facilitate air flow and/or for aesthetic reasons.

Figure 10:
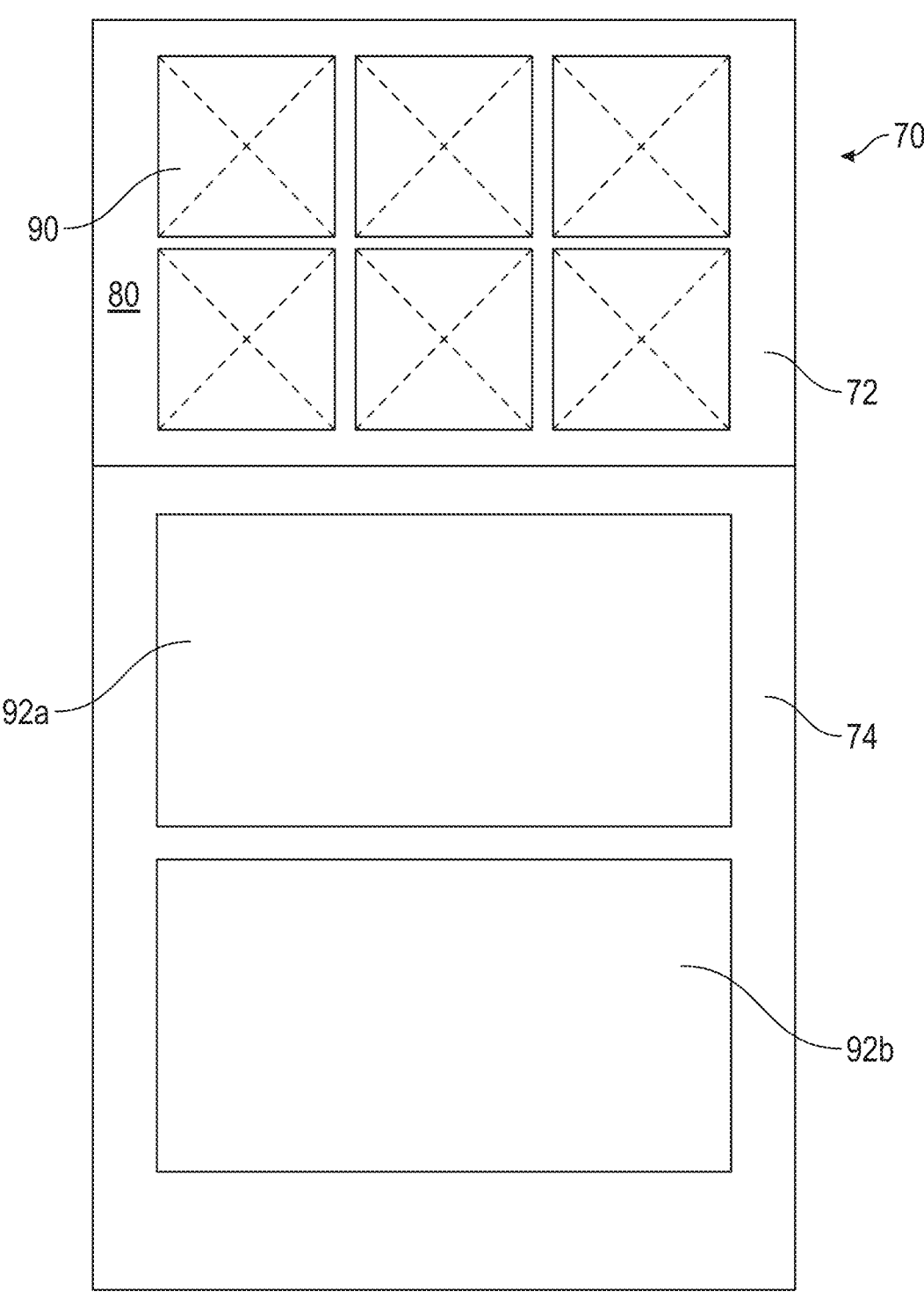
FIG. 10 is a schematic view of a two-tier roof according to one embodiment of the present invention illustrating a cargo holding forward portion, and a second rearward portion comprising solar panels.

FIG. 10 is a schematic plan view of a two-tier roof 70 according to one embodiment of the present invention. Two-tier roof includes cargo holding forward section 72, and rear section 74. FIG. 10 illustrates positioning cargo, or cargo containers, 90 on surface 80 of forward section 72. The cargo or cargo containers 90 are secured in place by cargo holder 110 (not shown). Rear section 74 can include features selected to increase functionality, such as one or more solar panels 92a, 92b.

Figure 11:
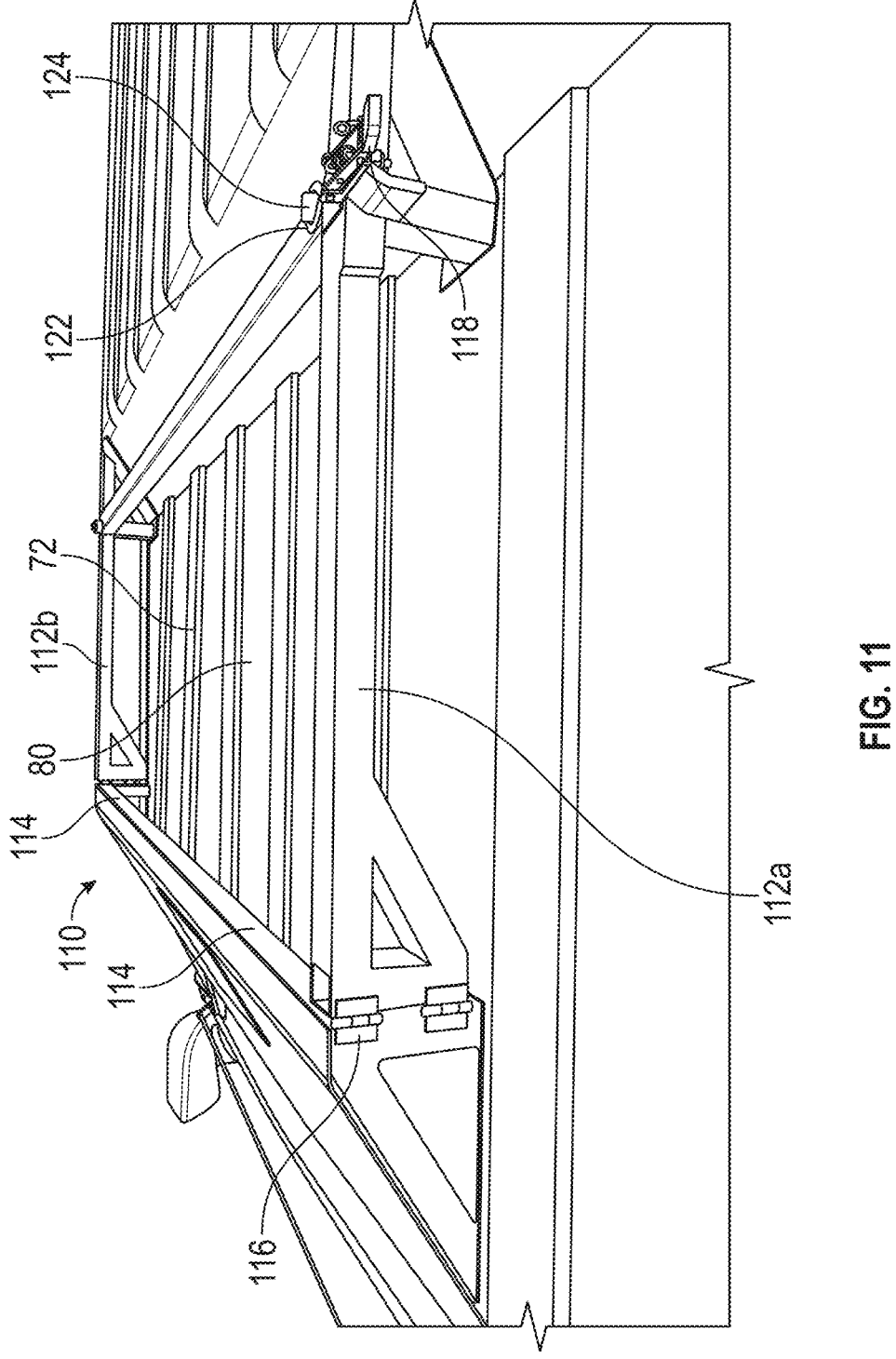
FIG. 11 is a side elevational view of a cargo holder associated with the first region of a two-tier roof, the cargo holder comprising one or more hinged gates that facilitate access to the cargo holder region, according to one embodiment of the present invention.
Figure 12:
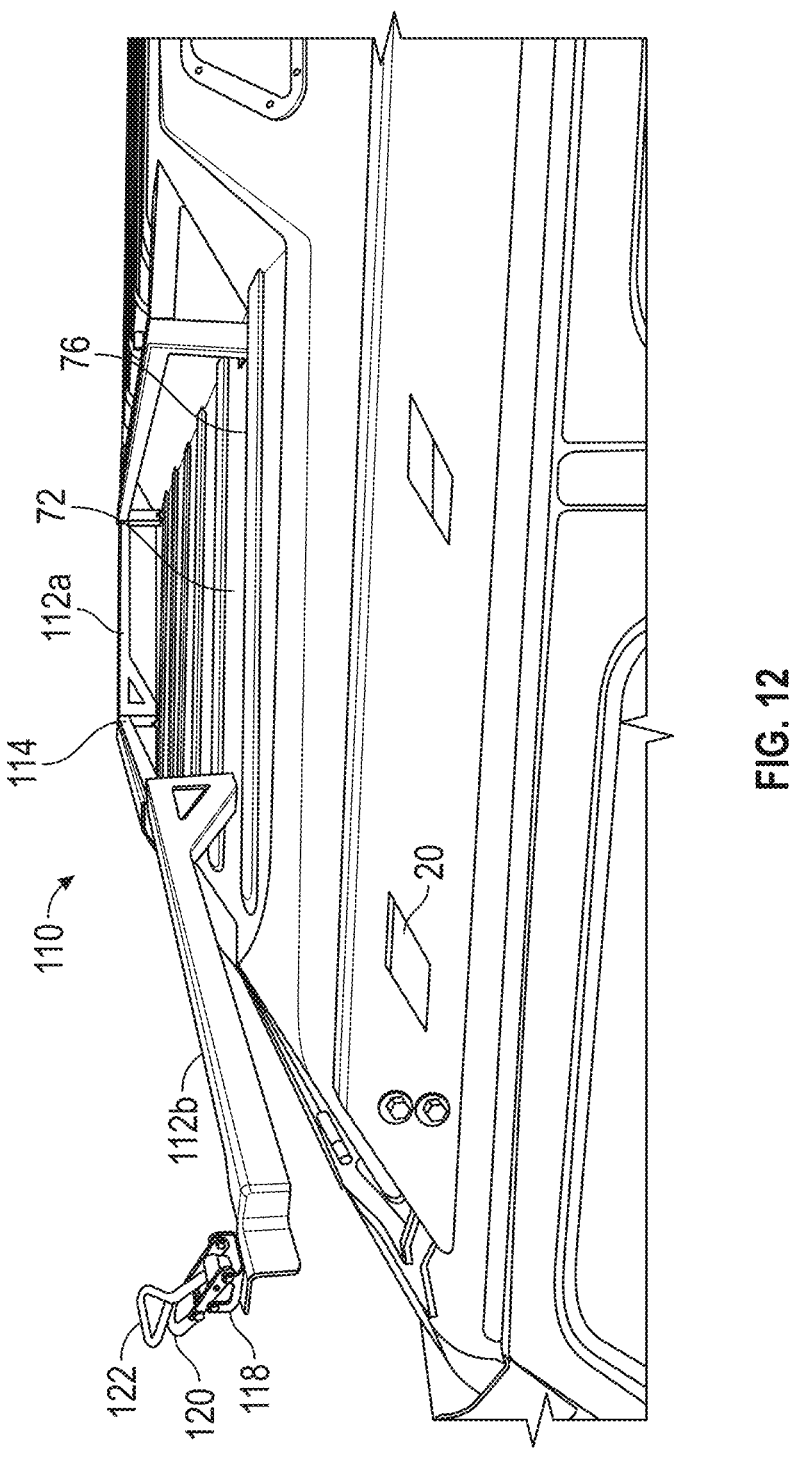
FIG. 12 is a side elevational view of a cargo holder associated with the first region of a two-tier roof with an open hinged gate that allows access to cargo stored in the cargo holding section.
Figure 15:
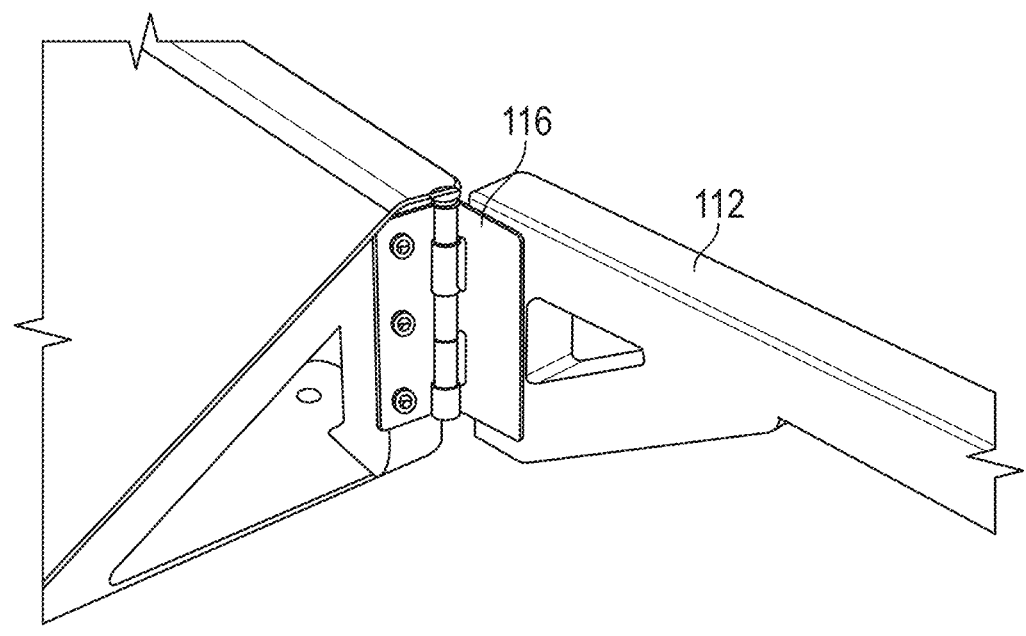
FIG. 15 is a close-up view illustrating the hinged gate of a cargo holder and an end plate/wind fairing according to one embodiment of the present invention.

FIGS. 11 and 12 are side elevational views of a cargo holder 110 that is secured to both an automobile (not shown) and to section 72 of a two-tier roof 70. The components of cargo holder 110 are associated with the first section of two-tier roof 70, and together with surface 80 define a cargo holding section. FIG. 12 shows open gate 112b that is coupled to front rail 114 by hinges 116 (FIG. 15), thereby allowing a user access to cargo stored in this section. FIGS. 11 and 12 further illustrates that the cargo holder 110 includes spring-actuated toggles 118 that include handle 120 to move latch 122 to engage catch 124 to either open or close the gates 112a, 112b.

Figure 13:
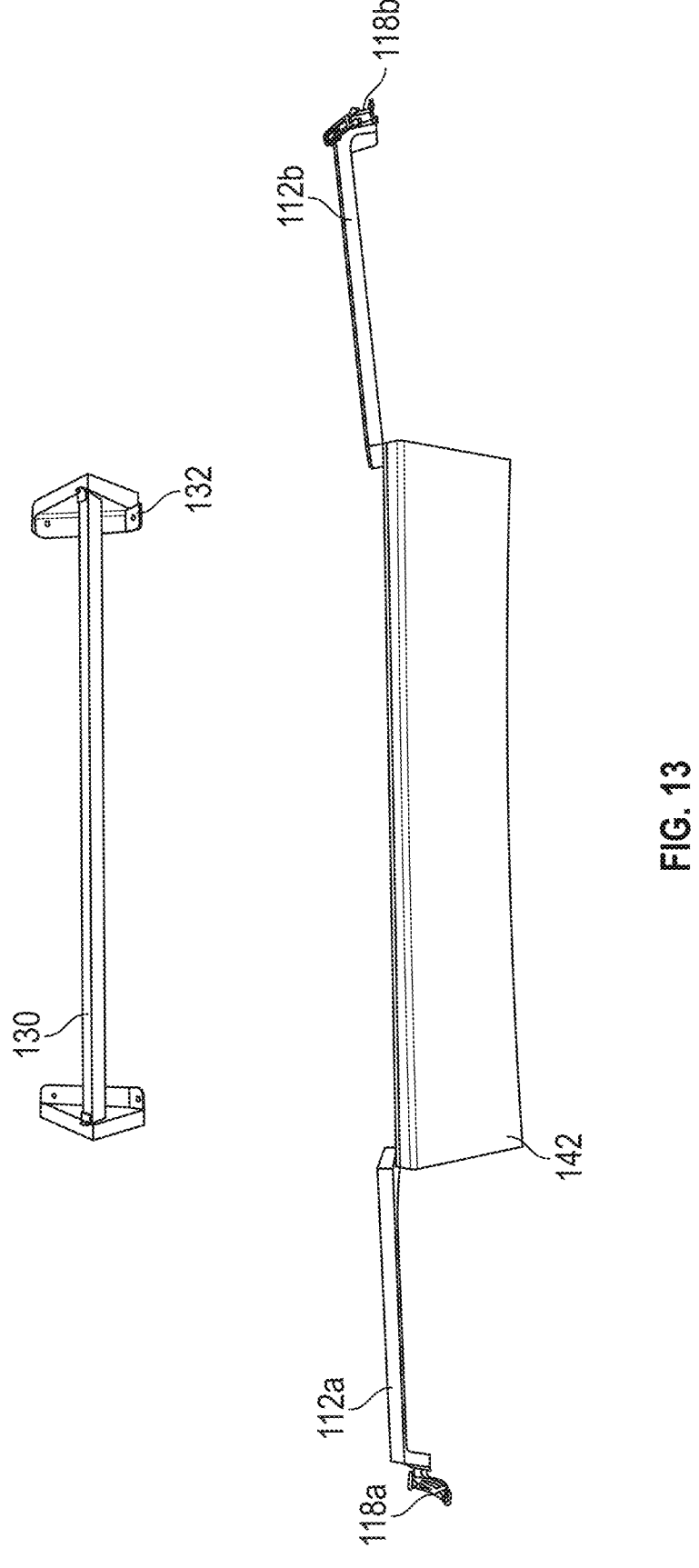
FIG. 13 is a disassembled elevational view showing components of one embodiment of a cargo holder comprising hinged gates and an end plate/wind fairing according to one embodiment of the present invention.
Figure 14:
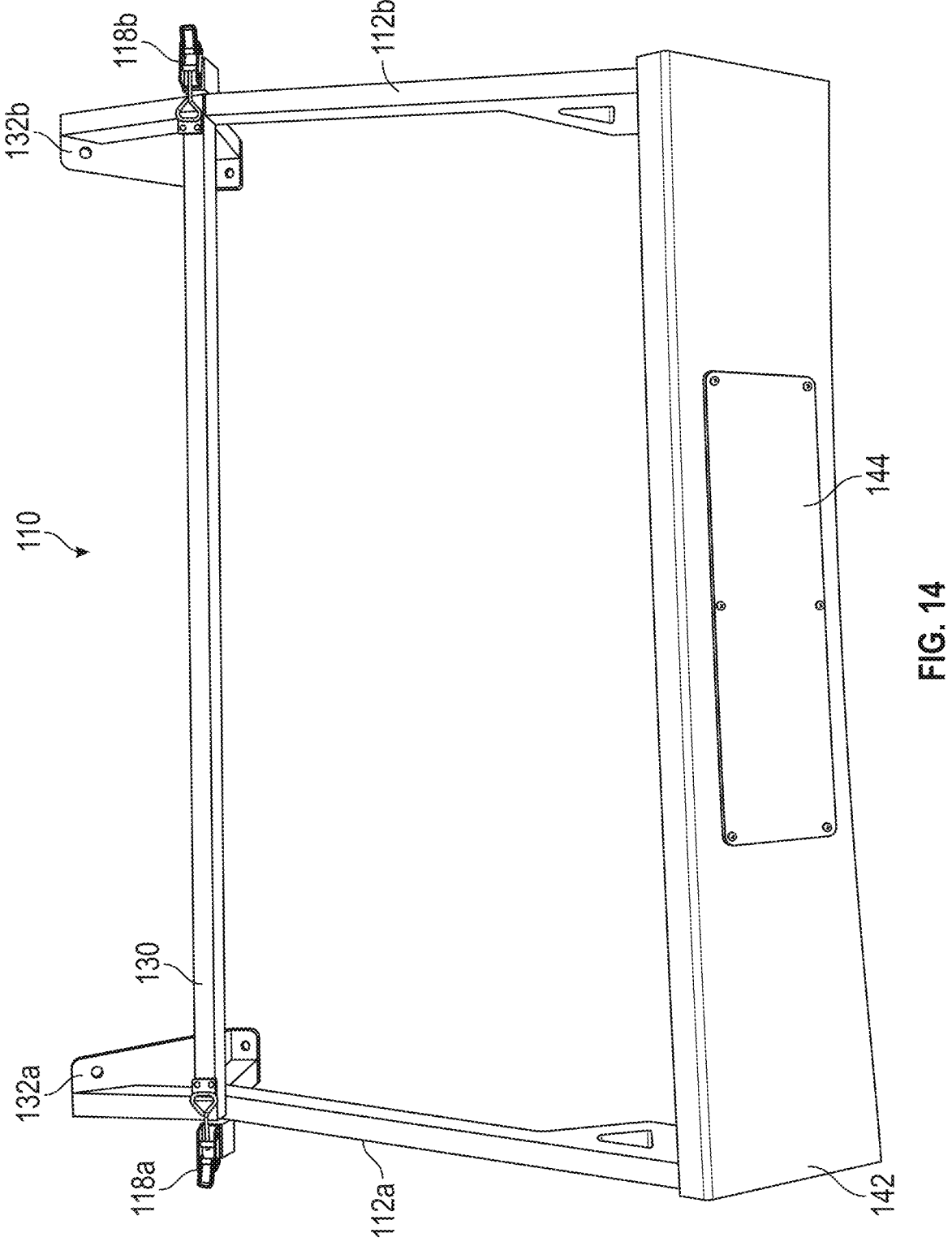
FIG. 14 is an assembled elevational view of the cargo holder components of FIG. 13.

FIG. 13 is a disassembled elevational view of the cargo holder 110 components, and FIG. 14 is an assembled elevational view of the cargo holder components. Cargo holder 110 comprises hinged gates 112a, 112b and end plate/wind fairing 142 that together define a cargo holder according to one embodiment of the present invention. With reference to FIGS. 13 and 14, cargo holder 110 includes a rear rail 130 and mounting brackets 132 for mounting cargo holder to a roof 70, such as a two-tier roof. Cargo holder gates 112a and 112b each includes toggles 118a, 118b for opening and closing the gates. Front portion 140 of cargo gate 110 includes fairing 142 and source of origin identifier 144 (FIG. 14).

Figure 16:
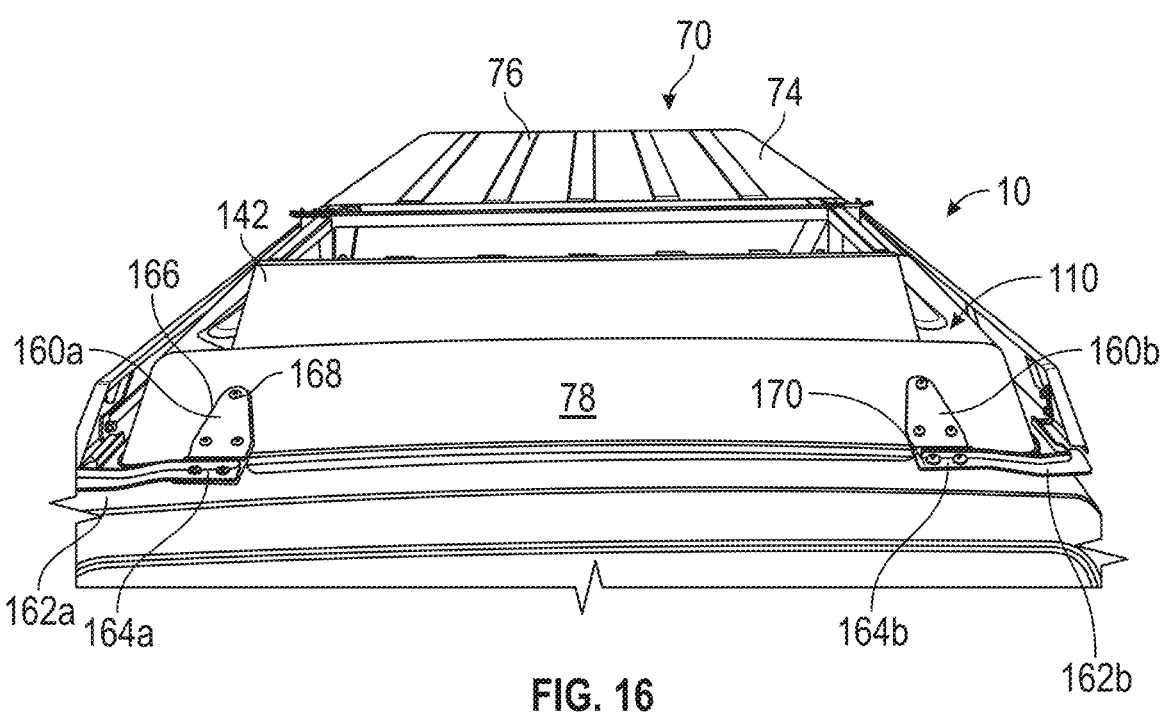
FIG. 16 is an automobile front end view illustrating a ring rack, two-tier roof, cargo holder and wind faring mounted to an automobile.

FIG. 16 is an automobile front end view illustrating an assembly of after-market automobile accessories comprising ring rack 10, two-tier roof 70, and cargo holder 110 with associated fairing 140. Roof 70 is coupled to ring rack 10 by hinged mounting brackets 160a, 160b. Ring rack 10 includes a mounting bracket arm 162 that is coupled to ring rack 10 by mounts 164a, 164b. Hinged mounting brackets 160 include a bracket plate 166, bolted to front portion 78 of the roof 70 by plural bolts 168. Mounting brackets are coupled to the ring rack 10 and automobile by plural bolts 170. Fairing 142 is oriented at substantially the same angle as front portion 78 of section 72 of the roof 70 to reduce drag and facilitate air flow over the top of the assembly.

Figure 17:
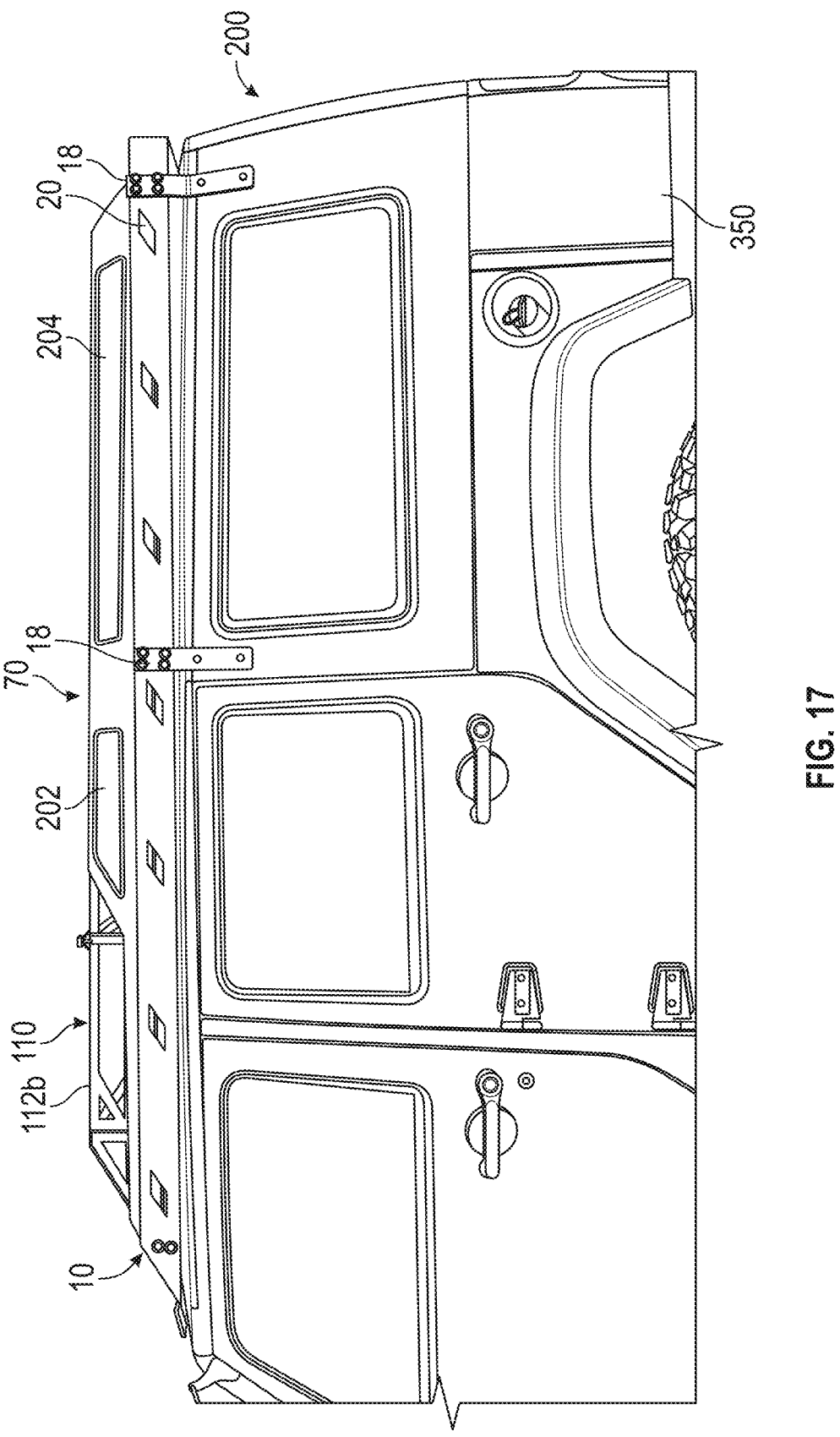
FIG. 17 is side view of an automobile with the ring rack, two-tier roof, cargo holder and wind fairing mounted to an automobile, the two-tier roof further comprising faux windows.
Figure 18:
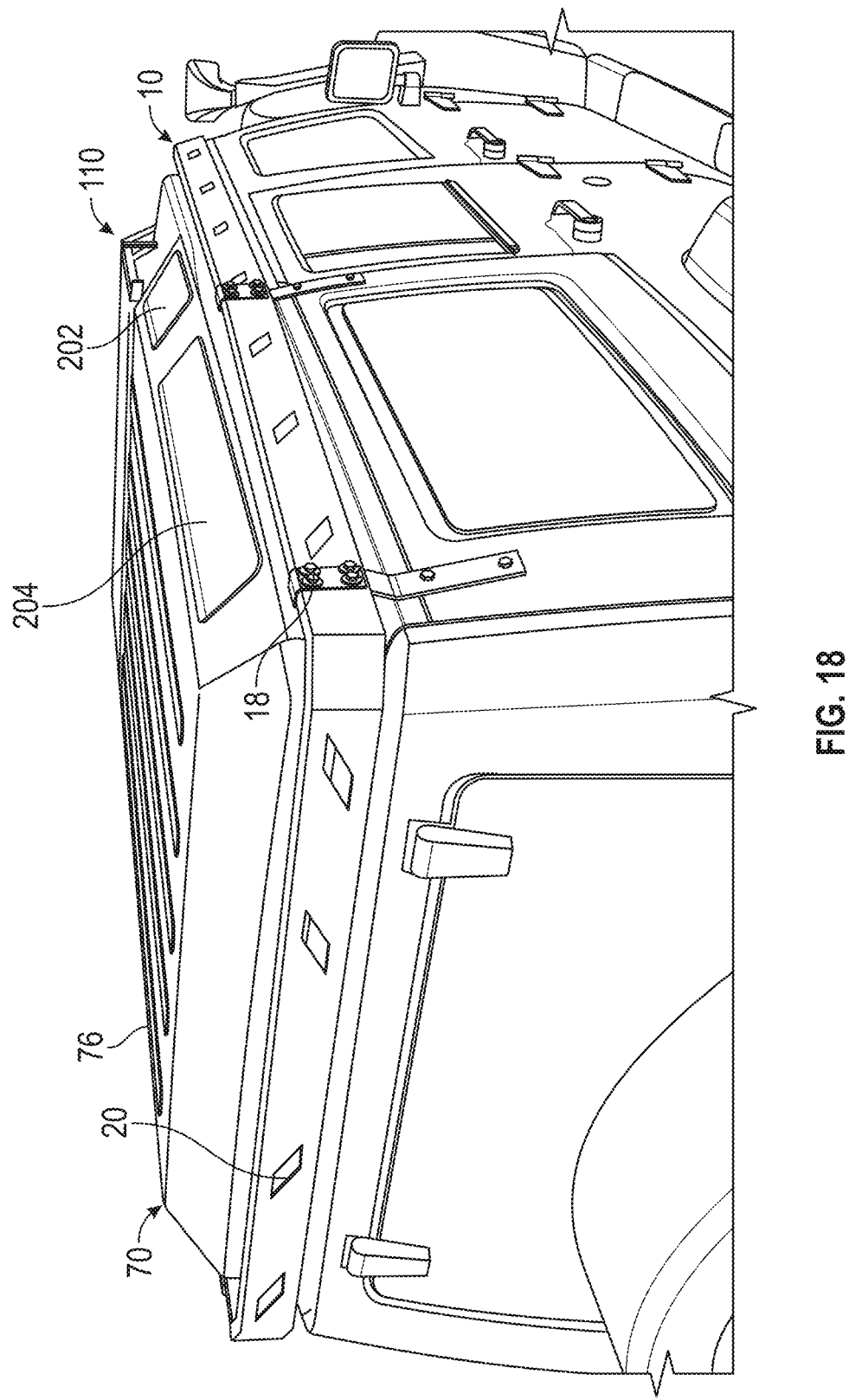
FIG. 18 is perspective view from the rear of an automobile illustrating a ring rack, two-tier roof, and cargo holder mounted to an automobile, the two-tier roof further comprising faux windows.

FIG. 17 is side view of an automobile 200, and FIG. 18 is perspective view from the rear of the automobile, together with an assembly of after-market automobile accessories comprising ring rack 10, two-tier roof 70, and cargo holder 110. Plural mounting brackets 18 couple the ring rack 10 to automobile 200. Ring rack 10 includes plural cutouts 20, a forward window or faux window 202 and/or a rear window or faux window 204.

Figure 19:
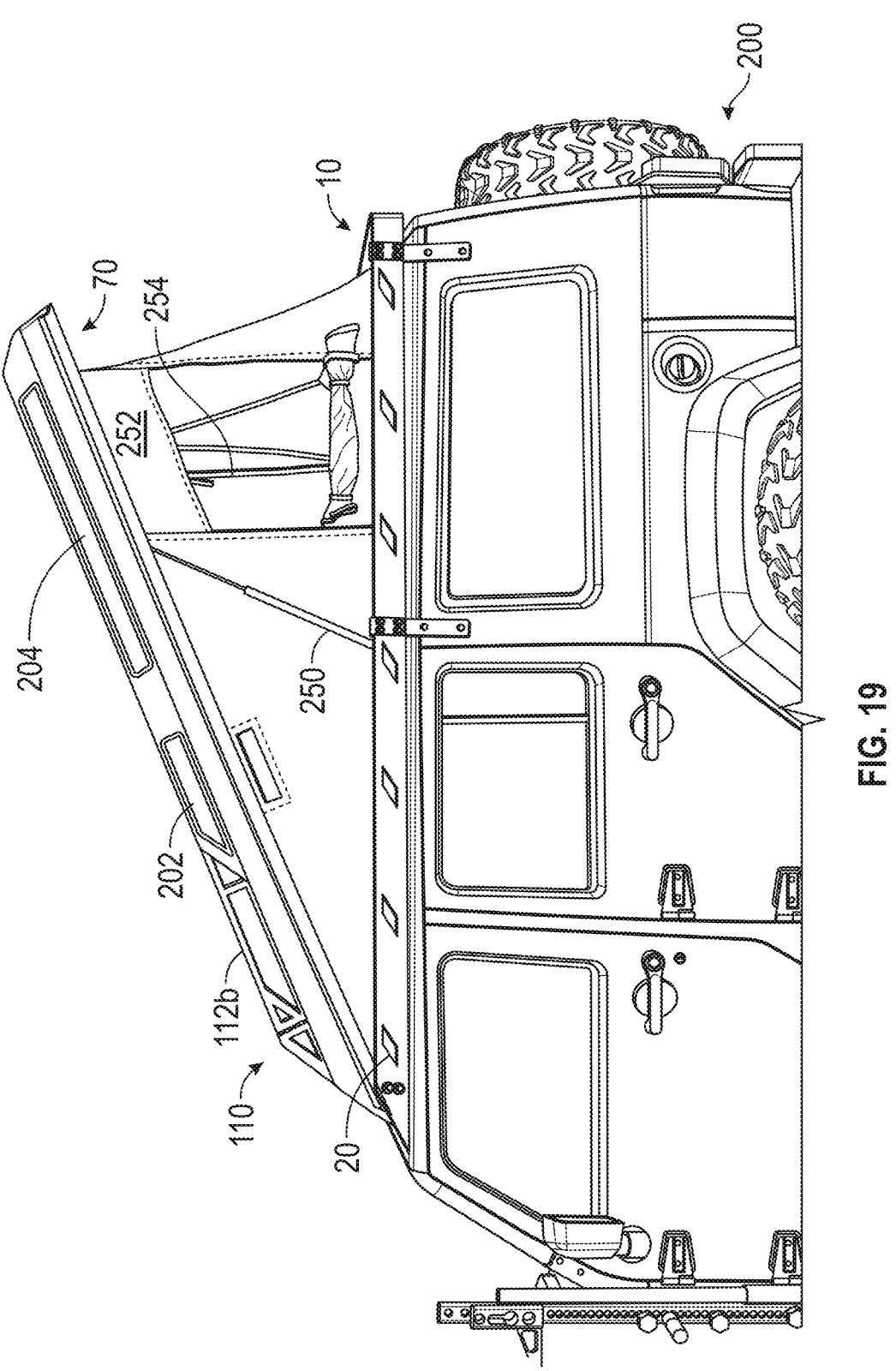
FIG. 19 is side view of an automobile illustrating the ring rack in an elevated position supported by pneumatic struts, together with a pop-up tent.
Figure 20:
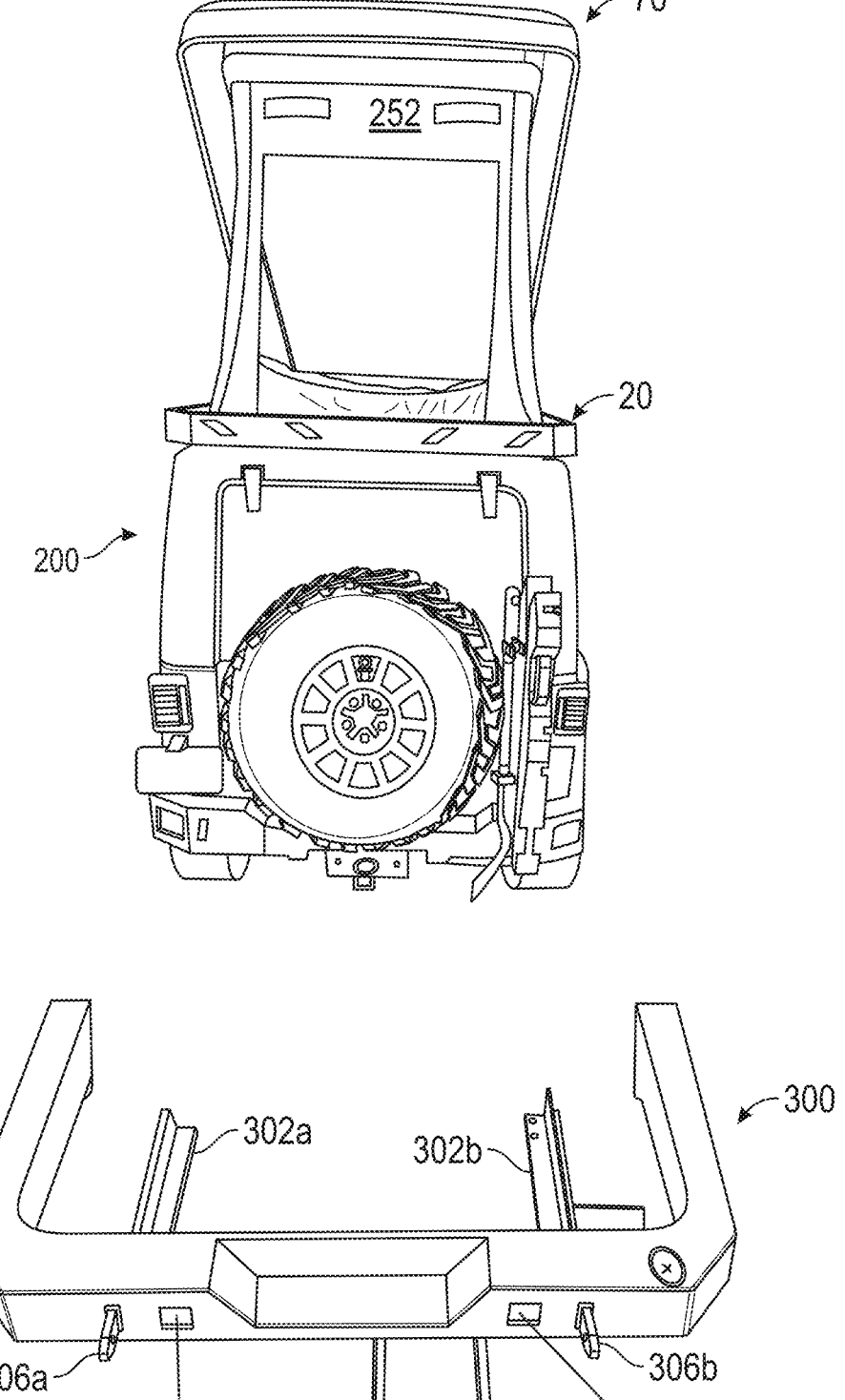
FIG. 20 is an end view of an automobile illustrating the ring rack in an elevated position, together with a custom-made bumper and extenders for attaching the bumper to an automobile.

FIG. 19 is side view of an automobile 200, and FIG. 20 is an end view of an automobile 200, illustrating the roof 70 in an elevated position supported by pneumatic struts 250. FIGS. 19 and 20 also illustrate a pop-up tent 252 that can be provided by a third-party manufacturer or can be a custom-made component of disclosed embodiments. A user can place the roof 70 in an upright or open position by opening the tail gate and window, if present, of the automobile 200, and simply apply sufficient upward pressure on an underneath surface of the roof 70 to raise it to the fully opened position. The assembly can include one or plural straps 254 to allow the user to close the roof 70, and to further secure the roof in a closed position, as desired.

Figure 21:
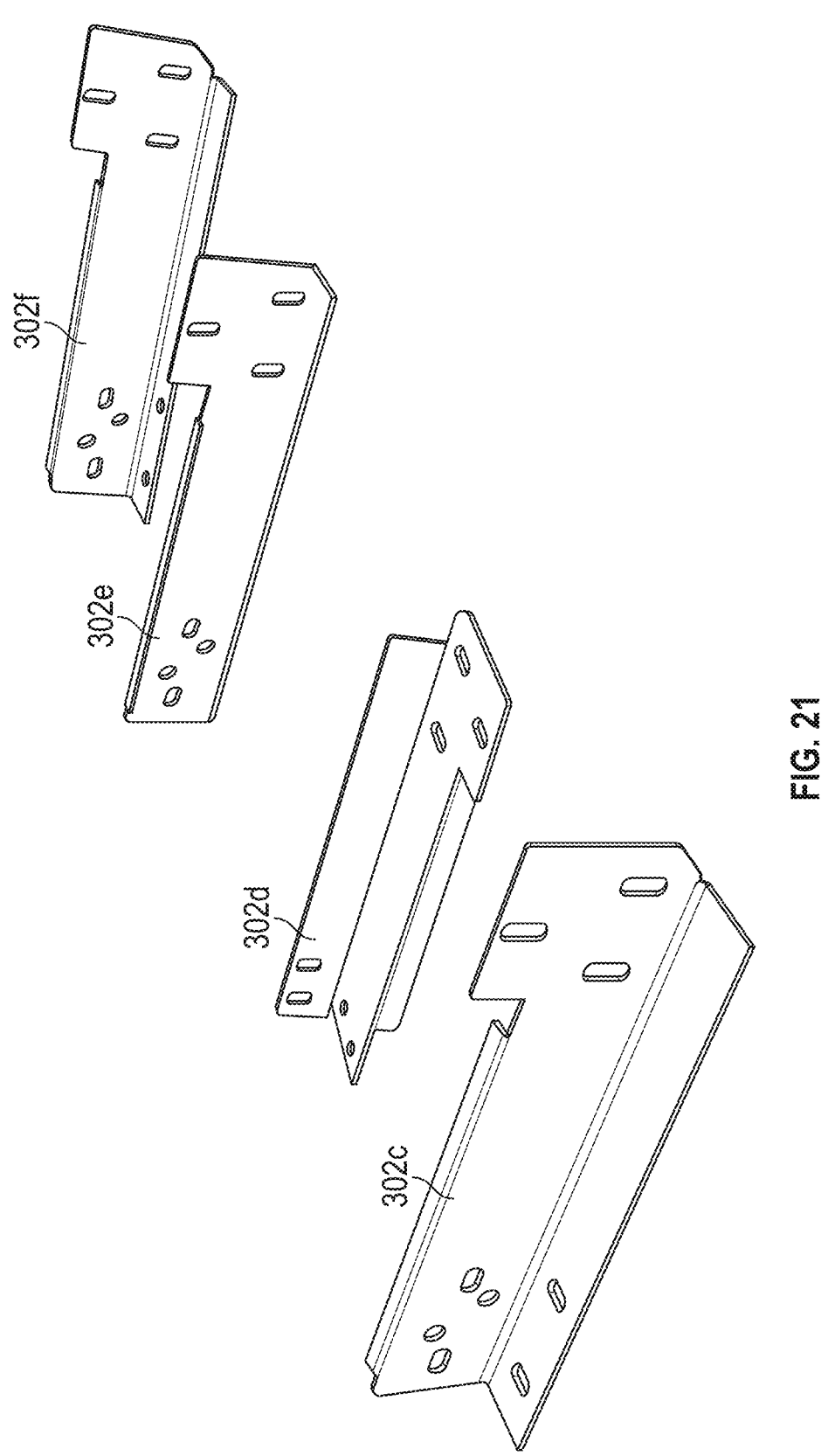
FIG. 21 is a perspective view illustrating embodiments of extenders for extending the length of an automobile.
Figure 22:
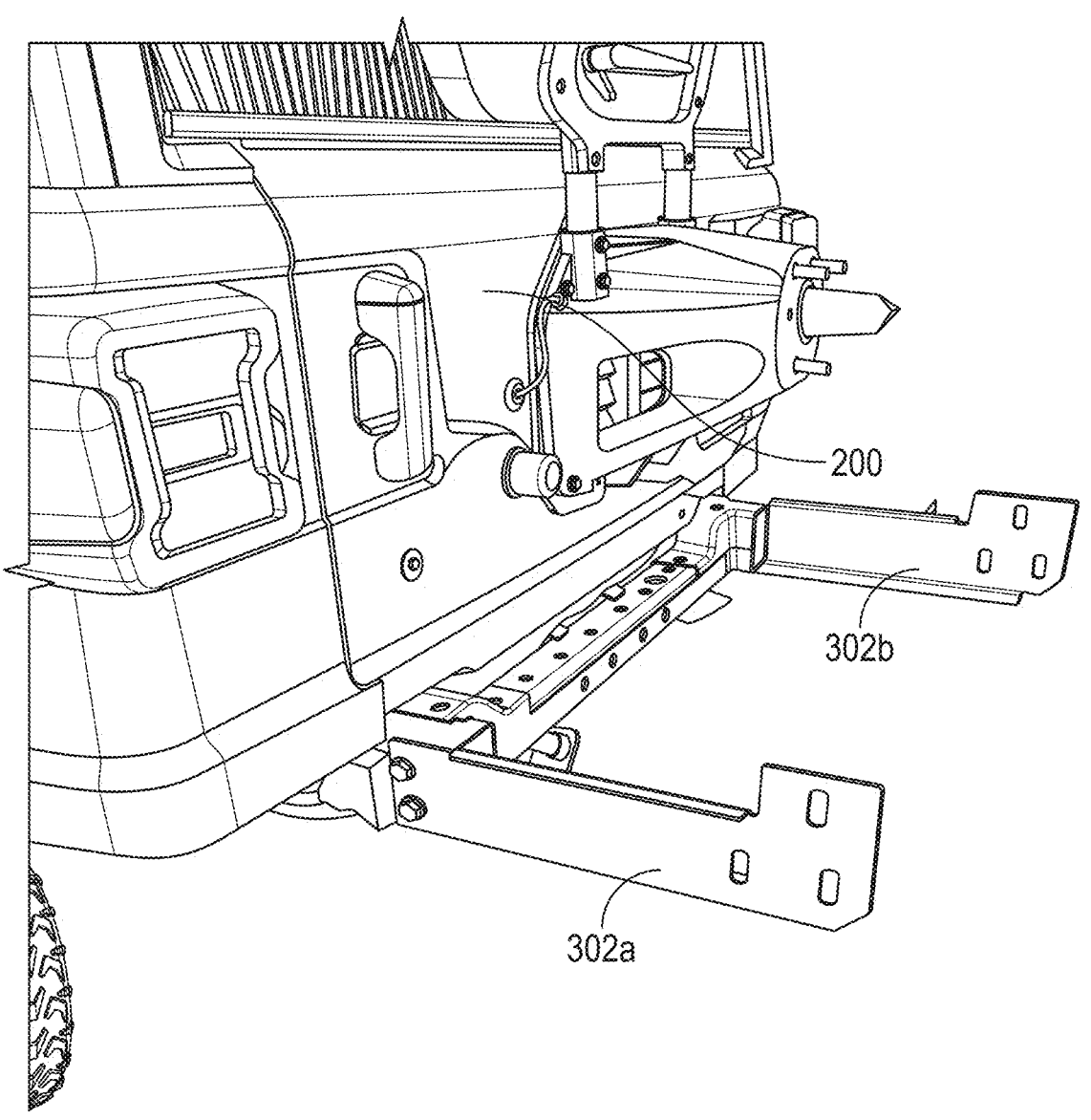
FIG. 22 is a perspective view illustrating an embodiment of extenders mounted to an automobile.
Figure 23:
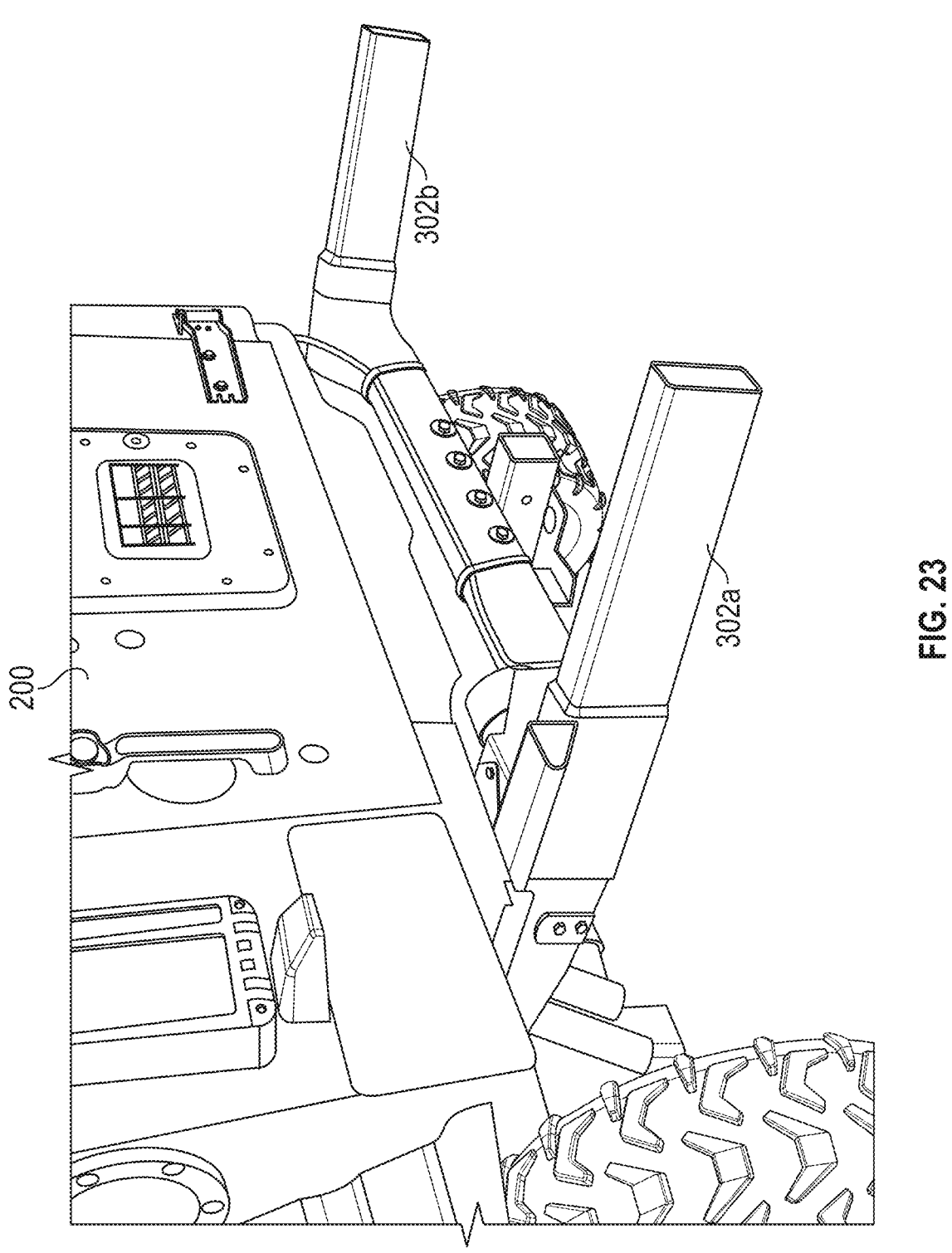
FIG. 23 is a perspective view illustrating a second embodiment of extenders mounted to an automobile.
Figure 24:
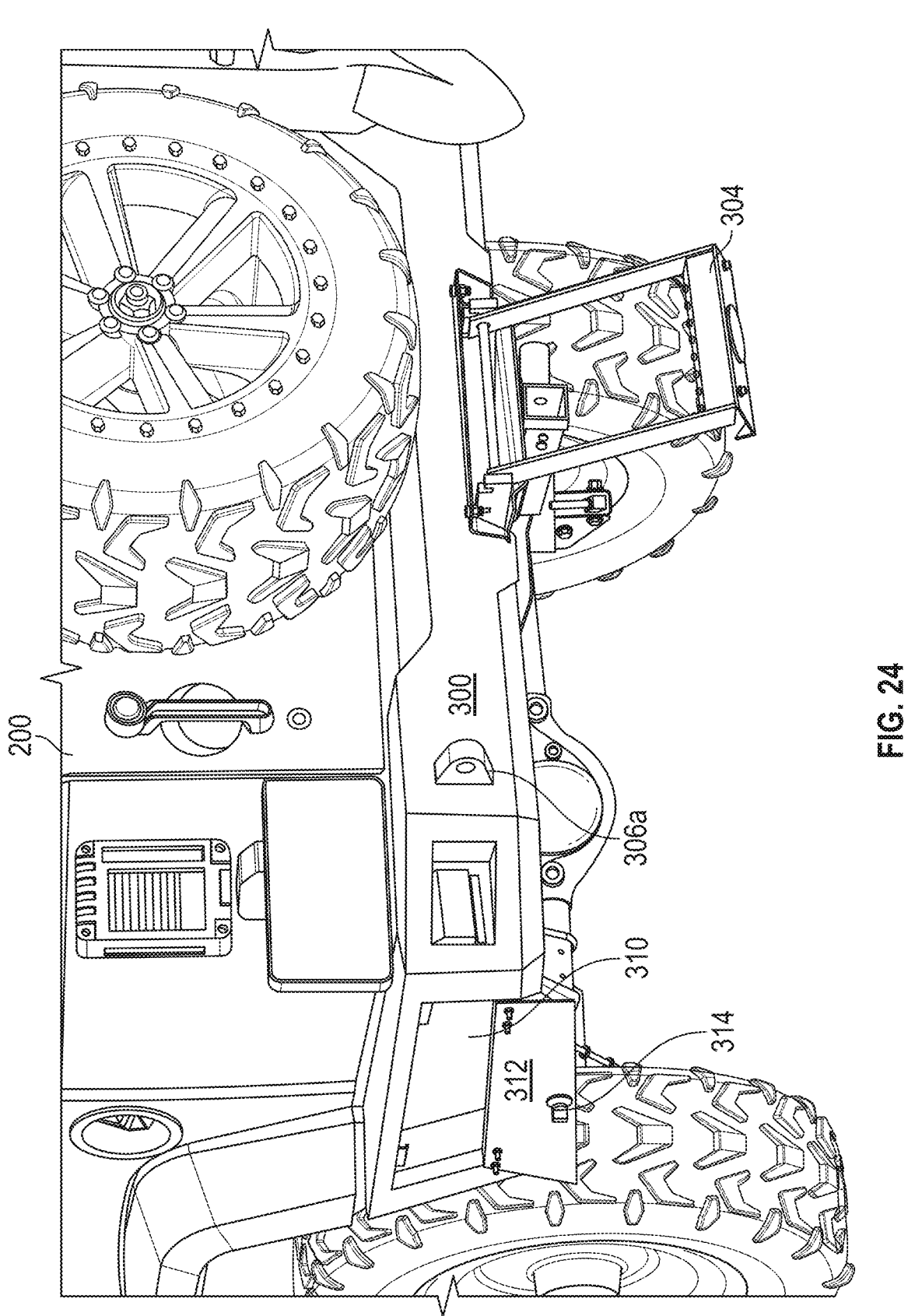
FIG. 24 is a perspective view illustrating certain features of one embodiment of a bumper according to the present invention, such as an added steps, and cargo, equipment or tool carriers comprising a door and latch built into the bumper.

FIG. 20 further illustrates an exemplary embodiment of a custom-made bumper 300 positioned adjacent to the automobile 200. FIG. 24 illustrates an embodiment of a bumper 300 mounted to an automobile 200. Bumper 300 is mounted to an automobile 200 using extension mounting brackets 302a, 302b. Additional views of different embodiments of extension brackets 302c-302f are provided by FIG. 21. A person of ordinary skill in the art will appreciate that the particular mounting brackets 302 that are selected will depend on the automobile 200 to which the bumper is to be attached, as well as the extension length required or desired to couple a custom bumper 300 to the automobile. FIG. 22, for example, is a perspective view of a first embodiment of extension mounting brackets 302a, 302b mounted to the automobile 200. FIG. 23 illustrates a different embodiment of extension mounting brackets 302a, 302b mounted to the automobile 200.

Figure 25:
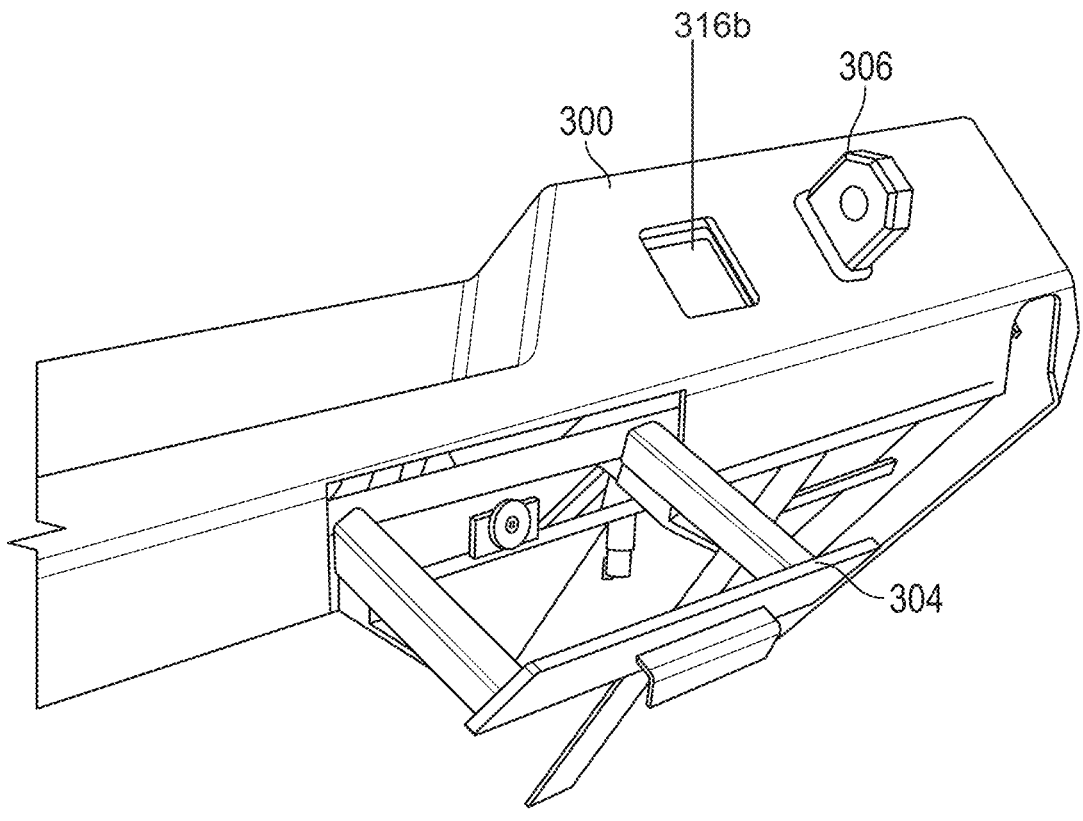
FIG. 25 is a perspective close-up view of a bumper according to the present invention comprising an integral step.

With reference to FIGS. 20, 24 and 25, bumper 300 includes a number of features to increase the utilitarian benefit of the bumper for the user. For example, bumper 300 includes a step 304 to facilitate a user's access to the interior of the automobile 200 and to allow a user to raise the roof 70. Bumper 300 also includes plural couplers 306a, 306b to which items, such as tow ropes or chains, can be coupled. FIG. 24 illustrates that disclosed embodiments of bumpers 300 can include built in storage sections 310 that include an access door 312 and latch 314. Built-in storage sections 310 can be included on both sides of bumper 300. Bumper 300 can also include cut-out accommodations for vehicle lights 316a, 316b (FIGS. 20 and 25).

Figure 26:
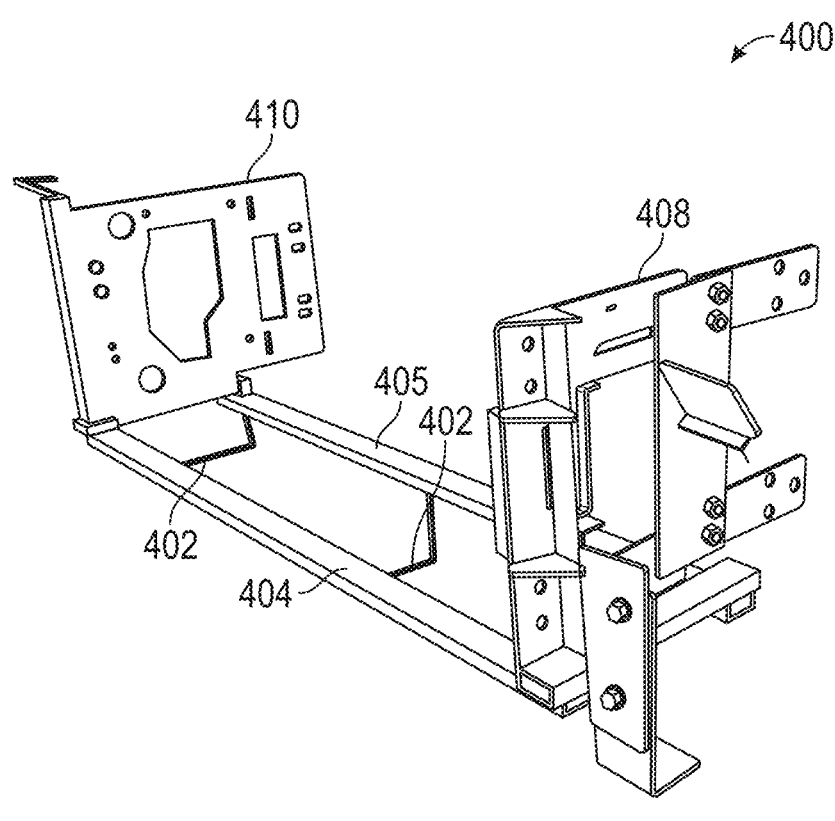
FIG. 26 is a perspective view of an extension tub framework for an automobile extension tub according to one embodiment of the present invention.

FIG. 17 is a side view of an automobile 200 that includes an extension tub 350. Extension brackets 302 and extension tub frames 400 (not shown in FIG. 17; see FIGS. 26-28) allow embodiments of extension tubs 350 to be mounted to an automobile 200. FIG. 26 is a perspective view illustrating one embodiment of an extension tub frame 400 and extension mounting brackets 402. Frame 400 includes plural mounting brackets 402, a front rail 404, a rear rail 406, and side plates 408 and 410. Extension tubs 350 can be associated with or formed about tub frame 400.

Figure 27:
FIG. 27 is a perspective view illustrating of an automobile extension tub according to one embodiment of the present invention.
Figure 28:
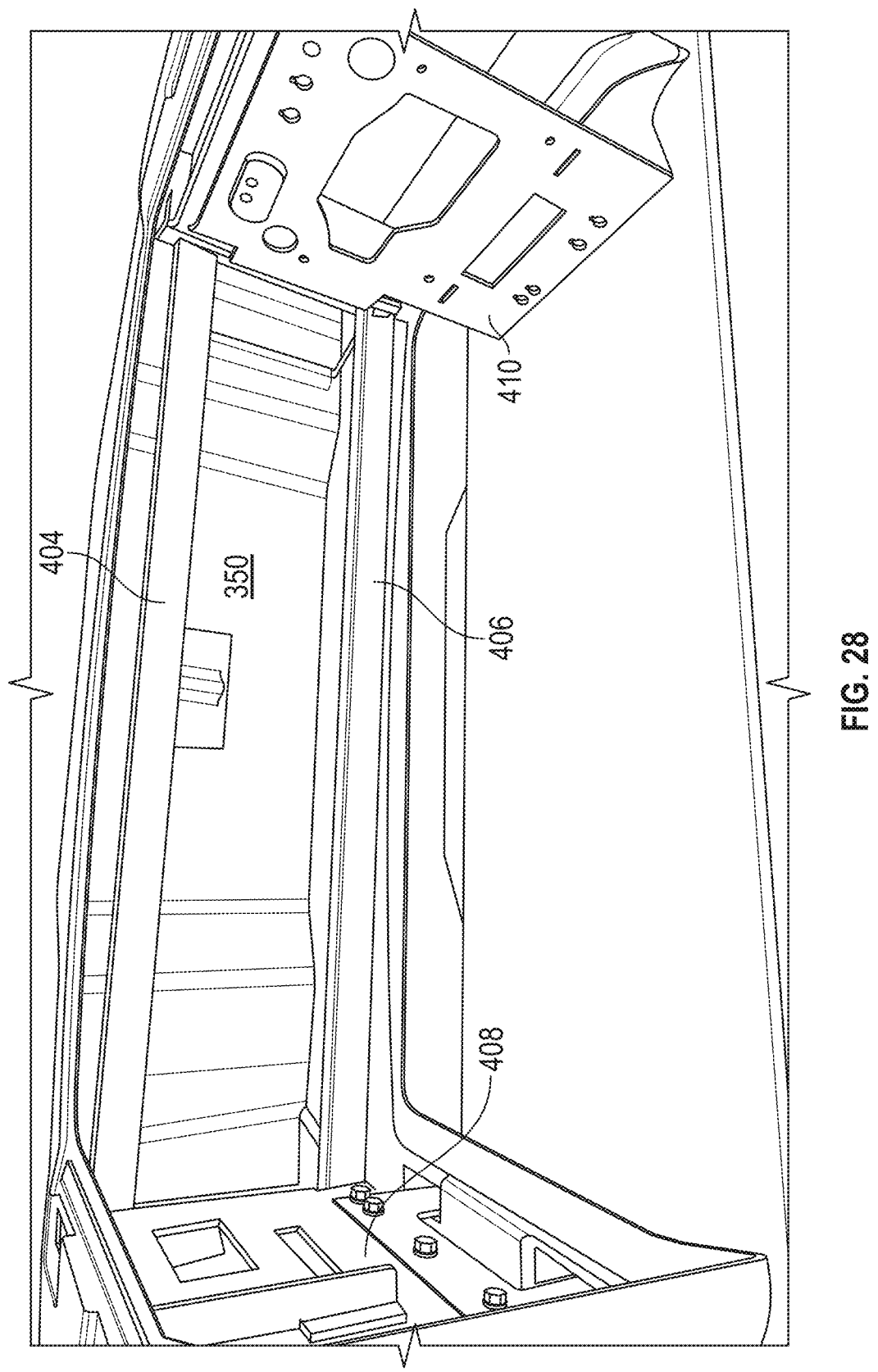
FIG. 28 is an end view of an automobile extension tub according to one embodiment of the present invention.

Exemplary embodiments of extension tubs 350 associated with tub frames 400 are best illustrated by FIGS. 27 and 28. FIG. 27 is a perspective view of an automobile extension tub 350, and FIG. 28 is an open-end view of an exemplary automobile extension tub 350 according to disclosed embodiments of the present invention. Tub 350 is shown associated with tub frames 400 that include rails 404 and 406, and side plates 408 and 410. Extension tubs 350 allow the length of an automobile 200 to be extended to accommodate the increased length that may be associated with ring rack 10 and roof 70.

Figure 29:
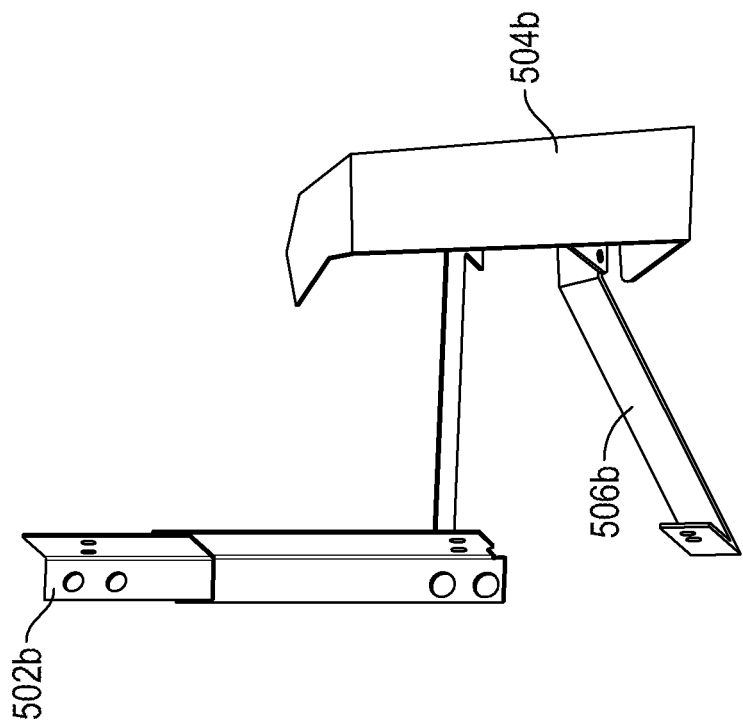
FIG. 29 illustrates one embodiment of a rear vehicle protection system according to the present invention.
Figure 29:
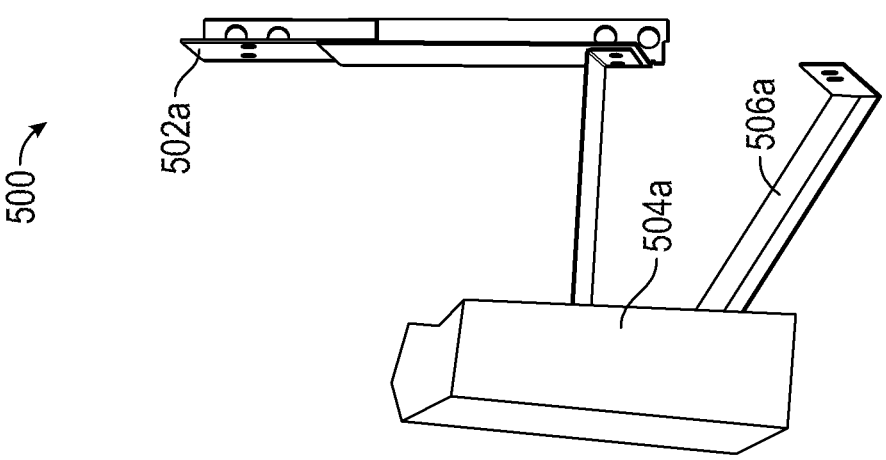

FIG. 29 provides a view of one embodiment of a rear and rear side vehicle protection system 500. Protection system 500 includes frame extenders 502a, 502b, and side protectors 504a, 504b.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. An assembly of automobile accessories, comprising:
a two-tiered roof attachable to a top portion of an automobile, said roof comprising a first forward section and a second rearward section, wherein the second section has an increased height relative to the first section;
a cargo holder, said cargo holder comprising:
a front rail that includes a fairing coupled thereto, the fairing being oriented at substantially a same angle as an angled end portion of the first section of the roof to facilitate wind deflection;
an end rail; and
two side gates that are coupled to the front rail by hinges to allow a user access to cargo stored in the cargo storage section, the side gates further comprising a spring-actuated latch and a catch and an actuation handle to facilitate moving the sides gates to either in an open or closed position;
wherein said first section of the roof defines a surface that, in association with said cargo holder, defines a cargo holding section.

2. An attachable roof assembly configured for mounting to a vehicle, the roof assembly comprising:
a two-tiered roof structure, comprising:
a first forward roof section comprising a cargo holding roof section, the first forward roof section extending from a forward edge disposed proximate to a front windshield of the vehicle when attached to the vehicle, said first forward roof section comprising a planar surface elevated and supported by an angled end section and two side edges, said first forward section having a first roof height corresponding to a height of the planar surface above a bottom surface of said two-tiered roof structure; and
a second rear roof section positioned immediately rearward of the first roof section, the second roof section comprising a planar surface elevated and supported by an end section, a rear edge, and two side edges, said second rear section having a second roof height corresponding to a height of the second roof section planar surface above the bottom surface of the two-tiered roof structure, wherein the second roof height is greater than the first roof height, and wherein the second roof section has a longitudinal axis that is equal to or greater than the longitudinal axis of said first roof section;
wherein, when attached to the vehicle, the forward edge of the first forward roof section is pivotally coupled to the vehicle, and lift mechanisms are positioned and configured to selectively raise and lower a rear portion of the two-tiered roof structure.

3. The attachable roof assembly of claim 2, further comprising a cargo holder having a front rail attached to said first forward roof section, the cargo holder further comprising a first side gate and a second side gate, said first side gate having a first end that is pivotally coupled to a first end of said front rail, and said second side gate having a first end that is pivotally coupled to a second end of said front rail, the cargo holder further comprising a rear rail, wherein a second end of the first side gate is releasably attachable to a first end of said rear rail and wherein a second end of the second side gate is releasably attachable to a second end of said rear rail.

4. The attachable roof assembly of claim 3, further comprising a first spring-actuated toggle secured to said second end of said first side gate, said toggle including a handle and a latch, and said toggle arranged to selectively and releasably engage a first catch formed on said first end of said rear rail.

5. The attachable roof assembly of claim 4, further comprising a second spring-actuated toggle secured to said second end of said second side gate, said second toggle including a handle and a latch, and said second toggle arranged to selectively and releasably engage a second catch formed on said second end of said rear rail.

6. The attachable roof assembly of claim 3, wherein said front rail of said cargo holder comprises a fairing coupled thereto, the fairing being oriented at substantially a same angle as the angled end section of the first section of the roof to facilitate wind deflection.

7. The attachable roof assembly of claim 2, wherein the lift mechanisms are defined as pneumatic struts positioned along opposite lateral sides of the vehicle.

8. The attachable roof assembly of claim 2, further comprising a U-shaped ring rack comprising:
a first side rail, having a first end and a second end;
a second side rail having a first end and a second end;
an end rail connecting said second end of said first side rail and said second end of said second side rail; and
one or more attachment members for securing said ring rack to a top perimeter of said vehicle;
wherein said roof assembly opens and closes without interference from said ring rack disposed around the sides and rear perimeter of said vehicle.

9. The attachable roof assembly of claim 8, wherein said ring rack further comprises one or more cutouts formed through one or more of the first side rail, the second side rail, and/or the end rail, said cutouts being configured for attachment of accessories, wherein said roof assembly is configured to be raised and lowered without requiring removal of the accessories attached to the ring rack.

10. The attachable roof assembly of claim 9, wherein said accessories are selected from a group consisting of awnings, tools, and lighting.

11. The attachable roof assembly of claim 2, wherein one or both of the first section and the second section include a plurality of ribs formed in the planar surfaces to increase the strength of the roof.

12. An attachable roof assembly configured for mounting to a vehicle, the roof assembly comprising:
a roof structure, comprising:
a first forward roof section comprising a cargo holding roof section, the first forward roof section extending from a forward edge disposed proximate to a front windshield of the vehicle when attached to the vehicle, said first forward roof section comprising a planar surface elevated and supported by an end section and two side edges, said first forward section having a first roof height corresponding to a height of the planar surface above a bottom surface of said roof structure; and a second rear roof section disposed rearward of the first roof section, the second roof section comprising a planar surface elevated and supported by an end section, a rear edge, and two side edges, said second rear section having a second roof height corresponding to a height of the second roof section planar surface above the bottom surface of the roof structure, wherein the second roof height is greater than the first roof height; and a cargo holder having a front rail attached to said first forward roof section, the cargo holder further comprising a first side gate and a second side gate, said first side gate having a first end that is pivotally coupled to a first end of said front rail, and said second side gate having a first end that is pivotally coupled to a second end of said front rail, the cargo holder further comprising a rear rail, wherein a second end of the first side gate is releasably attachable to a first end of said rear rail and wherein a second end of the second side gate is releasably attachable to a second end of said rear rail;

wherein, when attached to the vehicle, the forward edge of the first forward roof section is pivotally coupled to the vehicle, and lift mechanisms are positioned and configured to selectively raise and lower a rear portion of the roof structure.

13. The attachable roof assembly of claim 12, wherein the lift mechanisms are defined as pneumatic struts.

14. The attachable roof assembly of claim 12, further comprising a U-shaped ring rack comprising:

a first side rail, having a first end and a second end;

a second side rail having a first end and a second end;

an end rail connected to said second end of said first side rail and connected to said second end of said second side rail;

one or more attachment members for securing said ring rack to a top perimeter of said vehicle, wherein said roof assembly opens and closes without interference from said ring rack disposed around the sides and rear perimeter of said vehicle.

15. The attachable roof assembly of claim 14, wherein said ring rack further comprises one or more cutouts formed through one or more of the first side rail, the second side rail, and/or the end rail, said cutouts being configured for attachment of accessories, wherein said roof assembly is configured to be raised and lowered without requiring removal of the accessories attached to the ring rack.

16. The attachable roof assembly of claim 15, wherein said accessories are selected from a group consisting of awnings, tools, and lighting.

17. The attachable roof assembly of claim 12, wherein one or both of the first section and the second section include a plurality of ribs to increase the strength of the roof.

18. The attachable roof assembly of claim 12, further comprising a first spring-actuated toggle secured to said second end of said first side gate, said toggle including a handle and a latch, and said toggle arranged to selectively and releasably engage a first catch formed on said first end of said rear rail.

19. The attachable roof assembly of claim 18, further comprising a second spring-actuated toggle secured to said second end of said second side gate, said second toggle including a handle and a latch, and said second toggle arranged to selectively and releasably engage a second catch formed on said second end of said rear rail.

20. The attachable roof assembly of claim 12, wherein said front rail of said cargo holder comprises a fairing coupled thereto, the fairing being oriented at substantially a same angle as the angled end section of the first section of the roof to facilitate wind deflection.

* * * * *